US011746658B2

(12) United States Patent
Freeman et al.

(10) Patent No.: US 11,746,658 B2
(45) Date of Patent: Sep. 5, 2023

(54) TURBINE SHROUD WITH CONTAINMENT FEATURES

(71) Applicant: Rolls-Royce Corporation, Indianapolis, IN (US)

(72) Inventors: Ted J. Freeman, Danville, IN (US); Aaron D. Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 282 days.

(21) Appl. No.: 17/075,257

(22) Filed: Oct. 20, 2020

(65) Prior Publication Data

US 2022/0120185 A1 Apr. 21, 2022

(51) Int. Cl.
*F01D 5/14* (2006.01)
*F01D 25/24* (2006.01)
*F01D 11/08* (2006.01)

(52) U.S. Cl.
CPC .............. *F01D 5/143* (2013.01); *F01D 11/08* (2013.01); *F01D 25/246* (2013.01); *F05D 2230/64* (2013.01); *F05D 2240/11* (2013.01); *F05D 2260/36* (2013.01); *F05D 2300/6033* (2013.01); *Y10T 29/49323* (2015.01)

(58) Field of Classification Search
CPC ....... F01D 25/243; F01D 25/246; F01D 11/08; F01D 9/04; F05D 2300/6033; F05D 2240/11; F05D 2230/64; F05D 2260/36
See application file for complete search history.

(56) References Cited

U.S. PATENT DOCUMENTS

| 7,278,820 B2 * | 10/2007 | Keller .................... F01D 11/08 415/173.1 |
|---|---|---|
| 8,206,092 B2 | 6/2012 | Tholen et al. |
| 8,905,709 B2 * | 12/2014 | Dziech .................. F01D 25/246 415/173.1 |
| 9,976,435 B2 | 5/2018 | Borja et al. |
| 10,280,782 B2 | 5/2019 | McCaffrey et al. |
| 10,563,535 B2 | 2/2020 | Vetters et al. |
| 2014/0030072 A1 * | 1/2014 | Hillier .................. F01D 25/005 415/173.1 |
| 2015/0044049 A1 * | 2/2015 | Lamusga ............... F01D 11/08 416/182 |
| 2018/0195403 A1 * | 7/2018 | Kerns ................... F04D 29/526 |

* cited by examiner

*Primary Examiner* — Brian P Wolcott
*Assistant Examiner* — Jesse M Prager
(74) *Attorney, Agent, or Firm* — Barnes & Thornburg LLP

(57) ABSTRACT

An assembly adapted for use in a gas turbine engine includes a carrier and a blade track segment. The carrier extends at least partway about an axis. The blade track segment is supported by the carrier radially relative to the axis to define a portion of a gas path of the assembly.

20 Claims, 7 Drawing Sheets

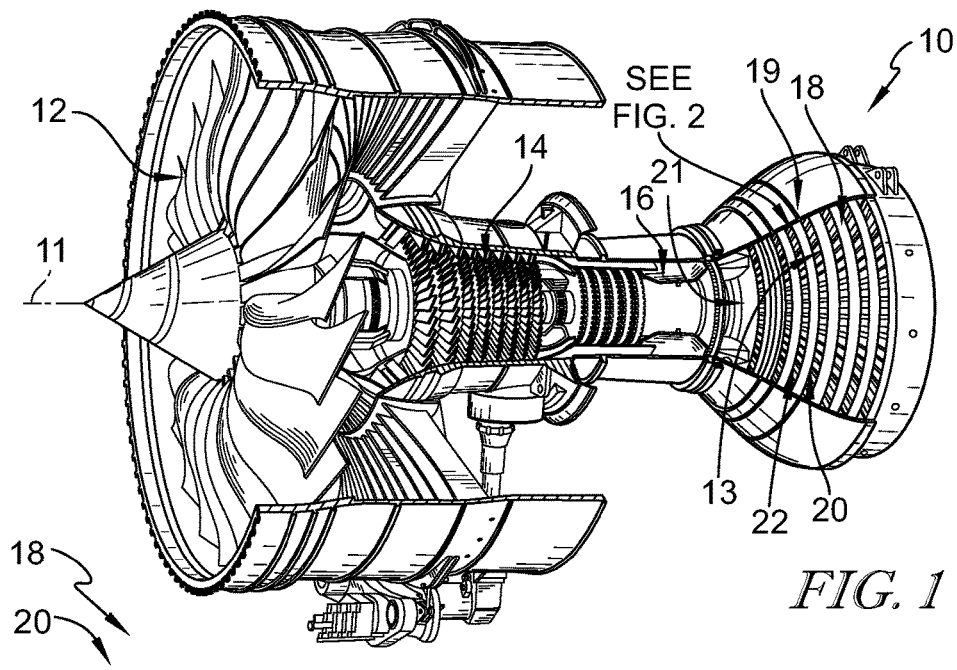
FIG. 1
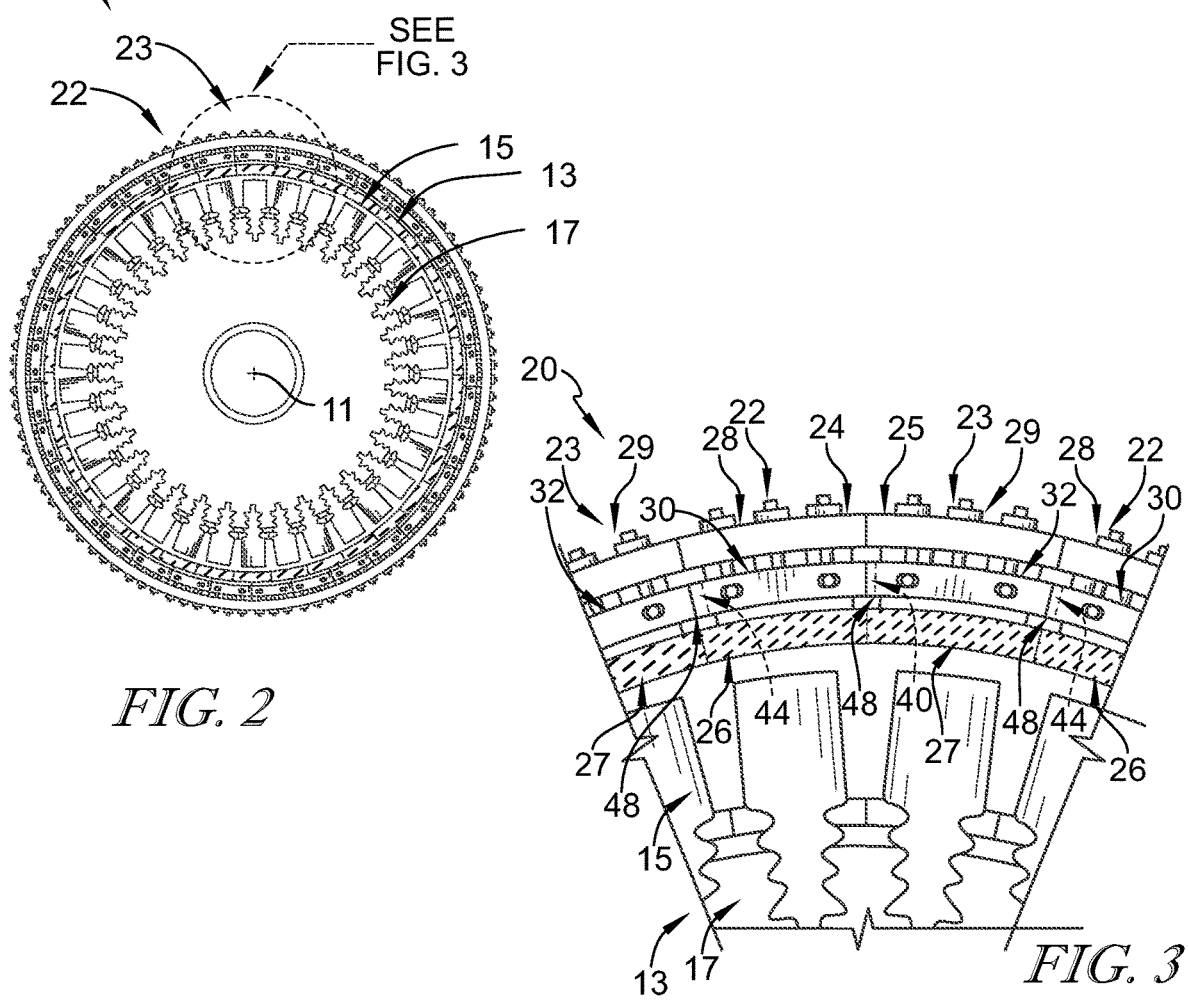
FIG. 2
FIG. 3

US 11,746,658 B2

TURBINE SHROUD WITH CONTAINMENT FEATURES

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements may present problems due to thermal expansion and/or material properties of the ceramic matrix composite components.

SUMMARY

The present disclosure may comprise one or more of the following features and combinations thereof.

A turbine shroud adapted for use in a gas turbine engine may include a first turbine shroud segment and a second turbine shroud segment. The second turbine shroud segment may be arranged circumferentially adjacent to the first turbine shroud segment.

In some embodiments, the first turbine shroud segment may include a first carrier, a first blade track segment, and a first intermediate carrier. The first carrier may comprise metallic materials and be arranged to extend circumferentially at least partway about a center axis. The first blade track segment may comprise ceramic matrix composite materials. The first intermediate carrier may be configured to couple the first blade track segment to the first carrier.

In some embodiments, the first blade track segment may be formed to include a first runner, a first fore mount post, and a first aft mount post. The first runner may be shaped to extend circumferentially partway around the center axis. The first fore mount post and the first aft mount post may each extend radially outward from the first runner. The first aft mount post may be spaced apart axially from the first fore mount post to define a first channel therebetween. The first intermediate carrier may be arranged axially in the first channel of the first blade track segment.

In some embodiments, the second turbine shroud segment may include a second carrier, a second blade track segment, and a second intermediate carrier. The second carrier may comprise metallic materials and be arranged to extend circumferentially at least partway about the center axis. The second blade track segment may comprise ceramic matrix composite materials. The second intermediate carrier may be configured to couple the second blade track segment to the second carrier.

In some embodiments, the second blade track segment may be formed to include a second runner, a second fore mount post, and a second aft mount post. The second runner may be shaped to extend circumferentially partway around the center axis. The second fore mount post and the second aft mount post may each extend radially outward from the second runner. The second aft mount post may be spaced apart axially from the second fore mount post to define a second channel therebetween. The second intermediate carrier may be arranged in the second channel of the second blade track segment.

In some embodiments, the first intermediate carrier may include a first intermediate carrier body and a flange. The first intermediate carrier body may be arranged between the first fore mount post and the second fore mount post in the first channel. The flange may extend circumferentially from a circumferential end of the first intermediate carrier body.

In some embodiments, the flange may engage an adjacent circumferential end of a second intermediate carrier body included in the second intermediate carrier to form an overlap between the first intermediate carrier body and the second intermediate carrier body. The overlap may close a gap between the first turbine shroud segment and the second turbine shroud segment and allow relative movement therebetween during operation of the gas turbine engine.

In some embodiments, the second intermediate carrier body may be shaped to include a groove. The groove may extend circumferentially into the adjacent circumferential end of the second intermediate carrier body. The groove may receive the flange of the first intermediate carrier to form the overlap.

In some embodiments, the first intermediate carrier body may be shaped to include a forward side surface and an aft side surface. The aft side surface may be spaced apart axially from the forward side surface.

In some embodiments, the circumferential end may extend between and interconnect the forward side surface and the aft side surface. Edges of the flange may be spaced apart axially from the forward side surface and the aft side surface of the first intermediate carrier body.

In some embodiments, the first intermediate carrier body may be shaped to include an outer radial surface and an inner radial surface. The inner radial surface may be spaced apart radially from the outer radial surface.

In some embodiments, the forward and aft side surfaces may extend between and interconnect the outer radial surface and the inner radial surface. Edges of the flange may be spaced apart radially from the outer radial surface and the inner radial surface of the first intermediate carrier body. In some embodiments, edges of the flange may be spaced apart axially and radially from edges of the circumferential end of the first intermediate carrier body.

In some embodiments, the flange of the first intermediate carrier includes a stem, a forward portion, and an aft portion. The stem may extend circumferentially from the circumferential end of the first intermediate carrier body. The forward portion may extend axially forward from the stem at an end of the stem. The aft portion may extend axially aft from the stem at the end of the stem.

In some embodiments, the second intermediate carrier may further include a flange. The flange may extend circumferentially from the adjacent circumferential end of the second intermediate carrier body. The flange of the second intermediate carrier may engage the flange of the first intermediate carrier to form the overlap. In some embodiments, the flange of the second intermediate carrier may radially overlap the flange of the first intermediate carrier.

In some embodiments, the flange of the first intermediate carrier may include a radially-outwardly facing surface. The flange of the second intermediate carrier may include a radially-inwardly facing surface. In some embodiments, the radially-outwardly facing surface may engage the radially-inwardly facing surface to form the overlap.

In some embodiments, the flange of the first intermediate carrier may be a first hook that includes a stem and an axially-extending portion. The stem may extend circumferentially from the circumferential end of the first intermediate carrier body. The axially-extending portion may extend axially aft from the stem to form a first flange channel that opens axially aft.

In some embodiments, the flange of the second intermediate carrier is a second hook that includes a stem and an axially-extending portion. The stem may extend circumferentially from the adjacent circumferential end of the second intermediate carrier body. The axially-extending portion may extend axially forward from the stem to form a second flange channel that opens axially forward.

In some embodiments, the axially-extending portion of the first hook may be located in the second flange channel. The axially-extending portion of the second hook may be located in the first flange channel to form the overlap.

In some embodiments, the first intermediate carrier may further include at least one pin and first retainers. The pin may extend axially into the first fore mount post, the first intermediate carrier body, and the first aft mount post to couple the first intermediate carrier body to the first blade track segment. The first retainers may each extend radially and couple the first intermediate carrier body with the first carrier.

In some embodiments, the second intermediate carrier body may further include at least one pin and second retainers. The pin may extend axially into the second fore mount post, the second intermediate carrier body, and the second aft mount post to couple the second intermediate carrier body to the second blade track segment. The second retainers may each extend radially and couple the second intermediate carrier body with the second carrier.

According to another aspect of the present disclosure, a turbine shroud adapted for use in a gas turbine engine may include a first turbine shroud segment and a second turbine shroud segment. The second turbine shroud segment may be arranged circumferentially adjacent to the first turbine shroud segment.

In some embodiments, the first turbine shroud segment may include a first carrier, a first blade track segment, and a first intermediate carrier. The first carrier may be arranged to extend circumferentially at least partway about a center axis. The first intermediate carrier may be configured to couple the first blade track segment to the first carrier.

In some embodiments, the first blade track segment may be formed to include a first runner and a first attachment portion. The first runner may be shaped to extend circumferentially partway around the center axis. The first attachment portion may extend radially outward from the first runner.

In some embodiments, the second turbine shroud segment may include a second carrier, a second blade track segment, and a second intermediate carrier. The second carrier may be arranged to extend circumferentially at least partway about the center axis. The second intermediate carrier may be configured to couple the second blade track segment to the second carrier.

In some embodiments, the second blade track segment may be formed to include a second runner and a second attachment portion. The second runner may be shaped to extend circumferentially partway around the center axis. The second attachment portion may extend radially outward from the second runner.

In some embodiments, the first intermediate carrier may be shaped to include a first intermediate carrier body, a plurality of first retainers, and a flange. The first intermediate carrier body may be coupled with the first attachment portion of the first blade track segment. The plurality of first retainers may extend radially and couple the first carrier with the first intermediate carrier body. The flange may extend circumferentially from a circumferential end the first intermediate carrier body and engage an adjacent circumferential end of a second intermediate carrier body included in the second intermediate carrier to form an overlap therebetween.

In some embodiments, the second intermediate carrier body may be shaped to include a groove. The groove may extend circumferentially into the adjacent circumferential end of the second intermediate carrier body. The groove may receive the flange of the first intermediate carrier to form the overlap.

In some embodiments, edges of the flange may be spaced apart axially from edges of the circumferential end of the first intermediate carrier body. In some embodiments, edges of the flange may be spaced apart axially and radially from edges of the circumferential end of the first intermediate carrier body.

In some embodiments, the flange of the first intermediate carrier may include a stem, a forward portion, and an aft portion. The stem may extend circumferentially from the circumferential end of the first intermediate carrier body. The forward portion may extend axially forward from the stem at an end of the stem. The aft portion may extend axially aft from the stem at the end of the stem.

In some embodiments, the second intermediate carrier may further include a flange. The flange may extend circumferentially from the adjacent circumferential end of the second intermediate carrier body and engage the flange of the first intermediate carrier to form the overlap. In some embodiments, the flange of the second intermediate carrier may radially overlap the flange of the first intermediate carrier.

In some embodiments, the flange of the first intermediate carrier may be a first hook that includes a stem and an axially-extending portion. The stem may extend circumferentially from the circumferential end of the first intermediate carrier body. The axially-extending portion may extend axially aft from the stem to form a first flange channel that opens axially aft.

In some embodiments, the flange of the second intermediate carrier may be a second hook that includes a stem and an axially-extending portion. The stem may extend circumferentially from the adjacent circumferential end of the second intermediate carrier body. The axially-extending portion may extend axially forward from the stem to form a second flange channel that opens axially forward.

In some embodiments, the axially-extending portion of the first hook may be located in the second flange channel. In some embodiments, the axially-extending portion of the second hook may be located in the first flange channel to form the overlap.

According to another aspect of the present disclosure, a method may include providing a first turbine shroud segment and a second turbine shroud segment. The first turbine shroud segment may include a first carrier, a first blade track segment, and a first intermediate carrier.

In some embodiments, the first blade track segment may include a first runner, a first fore mount post, and a first aft mount post. The first runner may be shaped to extend partway around an axis. The first fore mount post may extend radially outward from the first runner. The first aft mount post may be spaced apart axially from the first fore mount post and may extend radially outward from the first runner.

In some embodiments, the first intermediate carrier may include a first intermediate carrier body, a flange, and pins. The flange may extend circumferentially from a circumferential end of the first intermediate carrier body.

In some embodiments, the second turbine shroud segment may include a second carrier, a second blade track segment, and a second intermediate carrier. The second blade track segment may include a second runner, a second fore mount post, and a second aft mount post. The second runner may be shaped to extend partway around the axis. The second fore mount post may extend radially outward from the second runner. The second aft mount post may be spaced apart axially from the second fore mount post and may extend radially outward from the second runner. In some embodiments, the second intermediate carrier may include a second intermediate carrier body and pins.

In some embodiments, the method may further include arranging the first intermediate carrier body axially between the first fore mount post and the first aft mount post of the first blade track segment. In some embodiments, the method may further include inserting the pins axially through the first fore mount post, the first intermediate carrier body, and the first aft mount post to couple the first blade track segment to the first intermediate carrier body.

In some embodiments, the method may further include arranging the first intermediate carrier in an attachment space formed in the first carrier, coupling the first intermediate carrier with the first carrier, and arranging the second intermediate carrier body axially between the second fore mount post and the second aft mount post of the second blade track segment. In some embodiments, the method may further include inserting the pins axially through the second fore mount post, the second intermediate carrier body, and the second aft mount post to couple the second blade track segment to the second intermediate carrier body.

In some embodiments, the method may further include arranging the second intermediate carrier in an attachment space formed in the second carrier, coupling the second intermediate carrier with the first carrier, and arranging the second turbine shroud segment circumferentially adjacent to the first turbine shroud segment in the gas turbine engine. The second turbine shroud segment may be arranged adjacent to the first turbine shroud segment so that the flange of the first intermediate carrier engages an adjacent circumferential end of the second intermediate carrier body to form an overlap therebetween.

These and other features of the present disclosure will become more apparent from the following description of the illustrative embodiments.

BRIEF DESCRIPTION OF THE DRAWINGS

FIG. 1 is a cut-away perspective view of a gas turbine engine showing that the exemplary engine includes a fan, a compressor, a combustor, and a turbine and suggesting that the turbine includes static vane assemblies and turbine wheel assemblies surrounded by a turbine shroud;

FIG. 2 is a front elevation view of a turbine wheel assembly with the surrounding turbine shroud included in the turbine of the gas turbine engine of FIG. 1 showing that the turbine shroud comprise a plurality of turbine shroud segments that form a full hoop that extends around the turbine blades included in the turbine wheel assembly to resist combustion products from passing over the blades without interacting with the turbine blades;

FIG. 3 is a detail view of the turbine shroud of FIG. 2 showing each turbine shroud segment of the turbine shroud includes a carrier, a blade track segment comprising ceramic matrix composite materials, and an intermediate carrier configured to couple the blade track segment to the carrier, and showing the intermediate carriers of each turbine shroud segment each include an intermediate carrier body that extends circumferentially partway about the axis and a flange that extends circumferentially from the intermediate carrier body and engages the adjacent intermediate carrier body to form an overlap between adjacent turbine shroud segments that closes a gap between segments while allowing for relative movement between the segments;

DETAILED DESCRIPTION OF THE DRAWINGS

Figure 4:
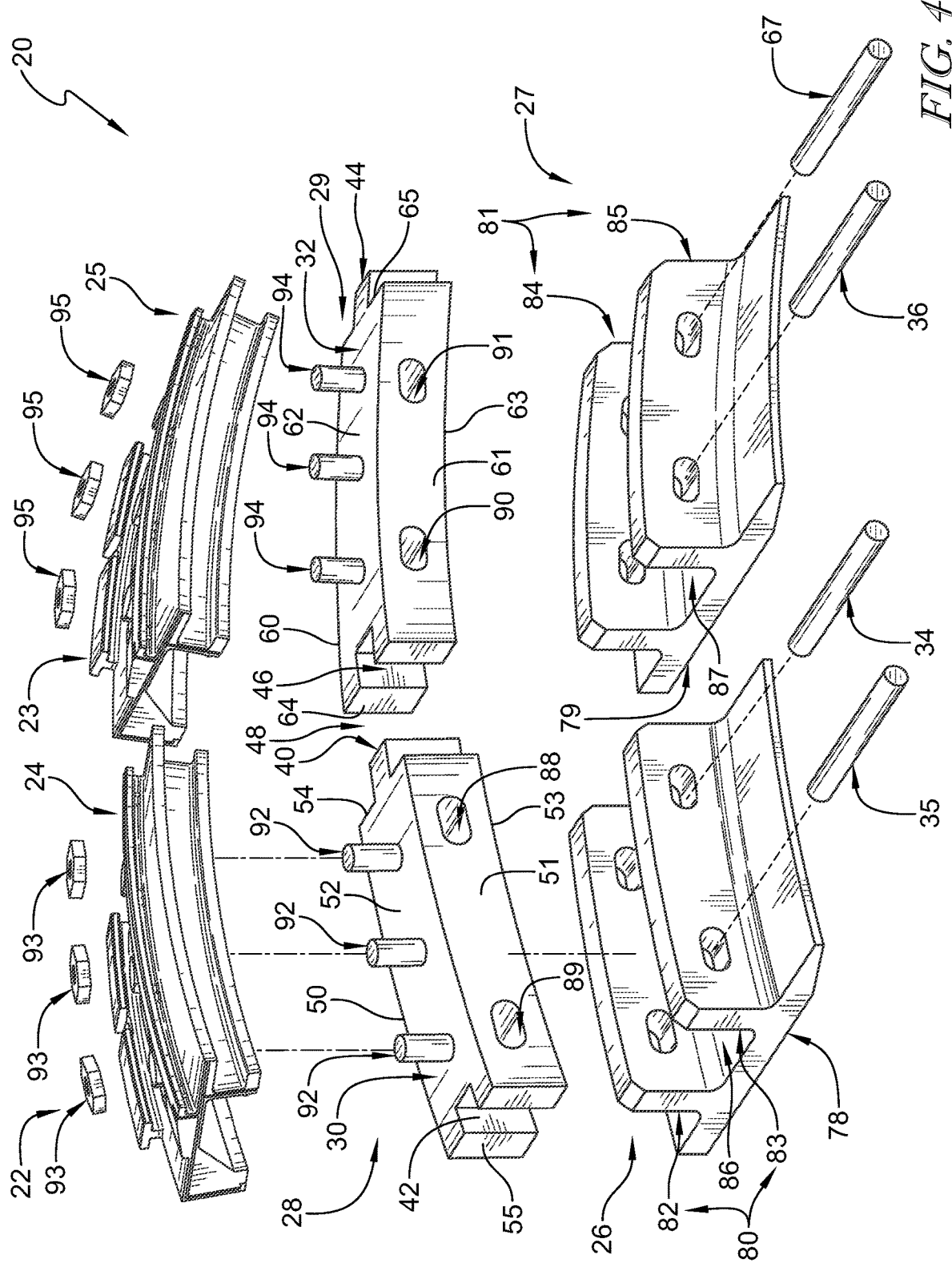
FIG. 4 is an exploded view of a portion of the turbine shroud of FIG. 3 showing the intermediate carrier of each turbine shroud segment is configured to be arranged in a channel formed in an attachment portion of each blade track segment.

For the purposes of promoting an understanding of the principles of the disclosure, reference will now be made to a number of illustrative embodiments illustrated in the drawings and specific language will be used to describe the same.

A turbine shroud adapted for use in a gas turbine engine 10 is shown in FIGS. 2-8. The turbine shroud 20 is made up of a number of shroud segments 22, 23 that each extend only partway around a central axis 11 of the gas turbine engine. A second shroud segment 23 is spaced circumferentially adjacent to a first shroud segment 22 in the illustrative embodiments. Each of the shroud segments 22, 23 cooperate to surround a turbine wheel assembly 13 of a turbine section 18 included in the gas turbine engine 10 as shown in FIGS. 1 and 2. The turbine shroud 20 extends around the turbine wheel assembly 13 to block combustion products from passing over the blades 15 without pushing the blades 15 to rotate as suggested in FIG. 2.

Each of the first and second turbine shroud segments 22, 23 includes a carrier 24, 25 a blade track segment 26, 27, and an intermediate carrier 28, 29 configured to couple the blade track segment 26, 27 to the carrier 24, 25 as shown in FIGS. 3-5, 7, and 8. The carrier 24, 25 is a metallic support component configured to interface with other metallic components of the gas turbine engine 10. The blade track segment 26, 27 is a ceramic matrix composite component configured to directly face the high temperatures of a gas path 21 of the gas turbine engine 10. The intermediate carrier 28, 29 is designed to engage the corresponding blade track segment 26, 27 so as to couple the blade track segment 26, 27 to the carrier 24, 25 and distribute mounting of the blade track segment 26, 27 to the carrier 24, 25.

Each intermediate carrier 28, 29 of the first and second shroud segments 22, 23 includes an intermediate carrier body 30, 32, illustratively two pins 34, 35, 36, 37 and a plurality of retainers 38, 39 as shown in FIGS. 3-8. The intermediate carrier body 30, 32 is arranged adjacent to an attachment portion 80 of the corresponding blade track segment 26, 27. The pins 34, 35, 36, 37 extend axially through the attachment portion 80 of the blade track segment 26, 27 and the intermediate carrier body 30, 32 to couple the blade track segment 26, 27 to the intermediate carrier body 30, 32. Each of the retainers 38, 39 extends outward from the corresponding intermediate carrier body 30, 32 to the carrier 24, 25 and engages the carrier 24, 25 to couple the intermediate carrier 28, 29 to the carrier 24, 25.

The first intermediate carrier 28 is shaped to include a flange 40 that mates with a groove 46 formed in the second intermediate carrier 29 as shown in FIGS. 3-6. The flange 40 extends circumferentially from a circumferential end the first intermediate carrier body 30 and engages the groove 46 formed in an adjacent circumferential end of the second intermediate carrier body 32 to form an overlap 48 therebetween. The overlap 48 closes a gap 49 between the first turbine shroud segment 22 and the second turbine shroud segment 23 and allows relative movement therebetween during operation of the gas turbine engine 10.

In an event one of the turbine blades 15 detaches from the rotor disk 17, the overlap 48 between the first intermediate carrier 28 and the second intermediate carrier 29 prevents the through blade 15 from bypassing the intermediate carriers 28, 29 prior to contacting a portion of the carriers 24, 25. The overlap 48 closes the gap 49 between the intermediate carriers 28, 29 so that the detached blade 15 contacts the intermediate carrier bodies 30, 32 reducing the energy in the blade 15 and helping contain the blade in the engine 10.

The first intermediate carrier 28 of the first shroud segment 22 includes the first intermediate carrier body 30, the pins 34, 35, and the first retainers 38 as shown in FIGS. 3-6. The first intermediate carrier body 30 is arranged adjacent to an attachment portion 80 of the first blade track segment 26. The pins 34, 35 extend axially through the attachment portion 80 of the first blade track segment 26 and first the intermediate carrier body 30 to couple the first blade track segment 26 to the first intermediate carrier body 30. Each of the first retainers 38 extends outward from the first intermediate carrier body 30 to the first carrier 24 and engages the first carrier 24 to couple the first intermediate carrier 28 to the first carrier 24.

Figure 6:
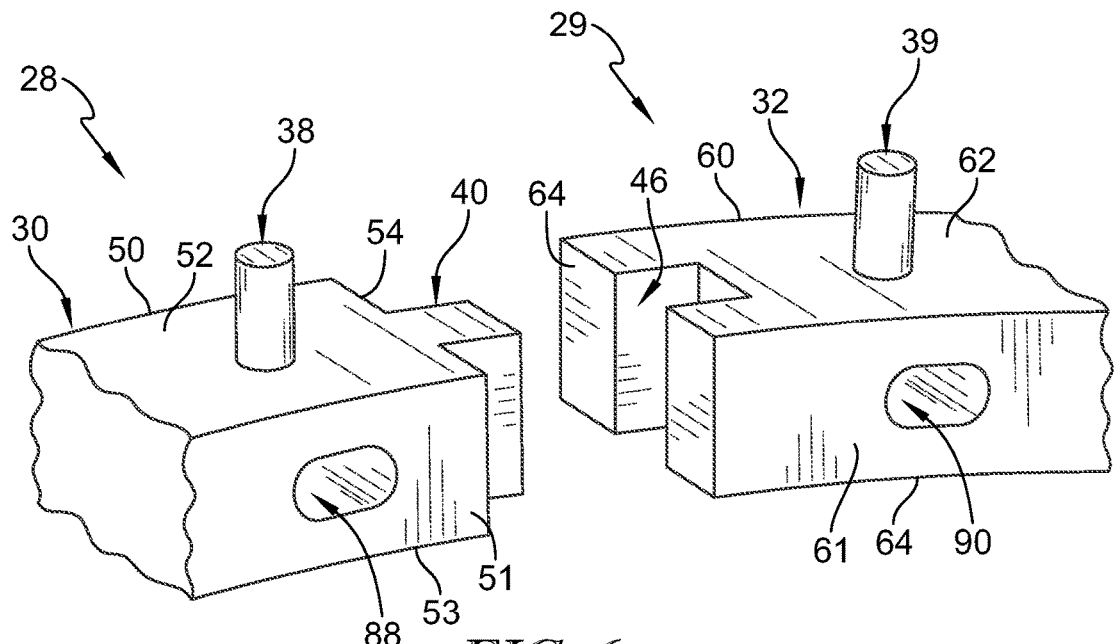
FIG. 6 is detail exploded view of the overlap between the adjacent turbine shroud segments of FIG. 4 showing the flange of the first intermediate carrier body mates with a groove formed in the second intermediate carrier body of the adjacent turbine shroud segment.
Figure 8:
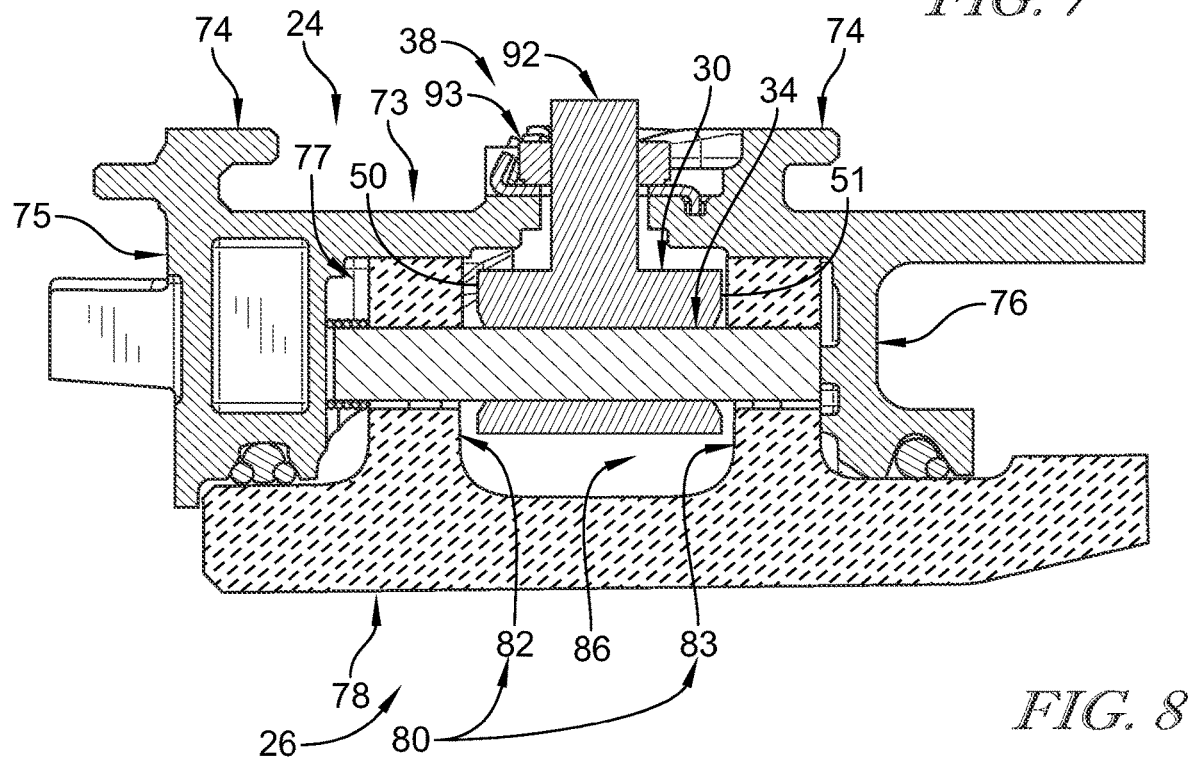
FIG. 8 is a detail view of FIG. 7 showing each blade track segment includes a runner that faces the gas path of the gas turbine engine, a fore mount post that extends radially outward from the runner, and an aft mount post that extends radially outward from the runner and spaced apart axially from the first fore mount post to define a first channel therebetween, and further the pins included in the intermediate carrier extend axially into the fore mount post, the intermediate carrier body, and the aft mount post.

The first intermediate carrier body 30 is shaped to include forward and aft side surfaces 50, 51, outer and inner radial surface 52, 53, and circumferential ends 54, 55 as shown in FIGS. 4, 6, and 8. The aft side surface 51 is spaced apart axially from the forward side surface 50, while the inner radial surface 53 is spaced apart radially from the outer radial surface 52. The forward and aft side surfaces 50, 51 extend between and interconnect the outer radial surface 52 and the inner radial surface 53. The circumferential ends 54, 55 are spaced apart circumferentially from each other and each extend between and interconnect the forward side surface 50 and the aft side surface 51.

In the illustrative embodiment, one circumferential end 54 is shaped to include the flange 40, while the other circumferential end 55 is shaped to include a groove 42 as shown in FIG. 4. The groove 42 formed in the circumferential end 55 is configured to receive a flange 44 of another turbine shroud segment 23 opposite the second turbine shroud segment 23. In the illustrative embodiment, edges of the flange 40 are spaced apart axially from the forward side surface 50 and the aft side surface 51 of the first intermediate carrier body 30.

The second intermediate carrier 29 of the second shroud segment 23 includes the second intermediate carrier body 32, at least one pin, illustratively two pins 36, 37, and a plurality of second retainers 39 as shown in FIGS. 3-6. The second intermediate carrier body 32 is arranged adjacent to an attachment portion 80 of the second blade track segment 27. The pins 36, 37 extend axially through the attachment portion 80 of the second blade track segment 27 and second the intermediate carrier body 32 to couple the second blade track segment 27 to the second intermediate carrier body 32. Each of the second retainers 39 extends outward from the second intermediate carrier body 32 to the second carrier 25 and engages the second carrier 25 to couple the second intermediate carrier 29 to the second carrier 25.

The second intermediate carrier body is shaped to include forward and aft side surfaces 60, 61, outer and inner radial surface 62, 63, and circumferential ends 64, 65 as shown in FIGS. 4 and 6. The aft side surface 61 is spaced apart axially from the forward side surface 60, while the inner radial surface 63 is spaced apart radially from the outer radial surface 62. The forward and aft side surfaces 60, 61 extend between and interconnect the outer radial surface 62 and the inner radial surface 63. The circumferential ends 64, 65 are spaced apart circumferentially from each other and each extend between and interconnect the forward side surface 60 and the aft side surface 61.

In the illustrative embodiment, one circumferential end 64 is shaped to include the groove 46, while the other circumferential end 65 is shaped to include a flange 44 as shown in FIG. 4. The flange 44 extends circumferentially from the circumferential end 65 of the second intermediate carrier body 32 and engages the groove 42 formed in another turbine shroud segment 22 opposite the first turbine shroud segment 22.

Turning again to the gas turbine engine 10, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Figure 7:
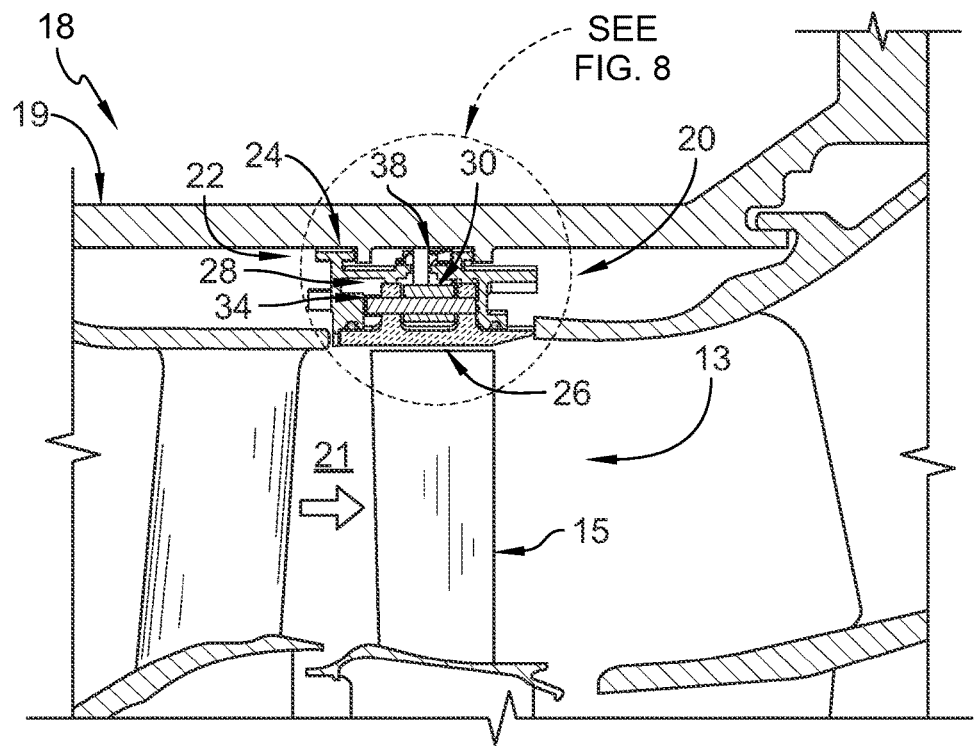
FIG. 7 is a partial cross-sectional view of the gas turbine engine of FIG. 1 showing a portion of the turbine in which the turbine shroud is located radially outward from blades of the turbine wheel assembly to block gasses from passing over the blades without interacting with the blades.

The turbine 18 includes at least one turbine wheel assembly 13 and the turbine shroud 20 positioned to surround the turbine wheel assembly 13 as shown in FIGS. 1, 2, and 7. The turbine shroud 20 is coupled to a case 19 of the gas turbine engine 10. The turbine wheel assembly 13 includes the plurality of blades 15 coupled to a rotor disk 17 for rotation therewith. The hot, high pressure combustion products from the combustor 16 are directed toward the blades 15 of the turbine wheel assembly 13 along the gas path 21. The blades 15 are in turn pushed by the combustion products to cause the turbine wheel assembly 13 to rotate; thereby, driving the rotating components of the compressor 14 and/or the fan 12.

The turbine shroud 20 extends around the turbine wheel assembly 13 to block combustion products from passing over the blades 15 without pushing the blades 15 to rotate as suggested in FIGS. 2 and 7. In the illustrative embodiment, the turbine shroud 20 is made up of a number of shroud segments 22, 23. In other embodiments, certain components of the turbine shroud 20 are segmented while other components are annular and non-segmented.

The carriers 24, 25 included in each shroud segment 22, 23 is coupled to the case 19 of the engine 10 as shown in FIG. 7. In the illustrative embodiment, the carrier 24, 25 is segmented, while in other embodiments, the carrier 24, 25 may be a full hoop and extend about the axis 11.

Each carrier segment 24, 25 illustratively includes an outer wall 73, hangers 74, and fore and aft walls 75, 76 as shown in FIG. 8. The outer wall 73 extends circumferentially partway about the axis 11 and is shaped to include through holes that receive a portion of the retainers 38, 39. The hangers 74 extend radially outward from the outer wall 73 and engage the case 19 to couple the turbine shroud segment 22, 23 to the rest of the engine 10. Each of the fore and aft walls 75, 76 extend radially inward from the outer wall 73 on opposite axial ends of the outer wall 73. The aft wall 76 is spaced apart axially from the fore wall 75 to define the attachment-receiving space 77 therebetween that receives the attachment portion 80 of the blade track segment 26, 27.

Figure 5:
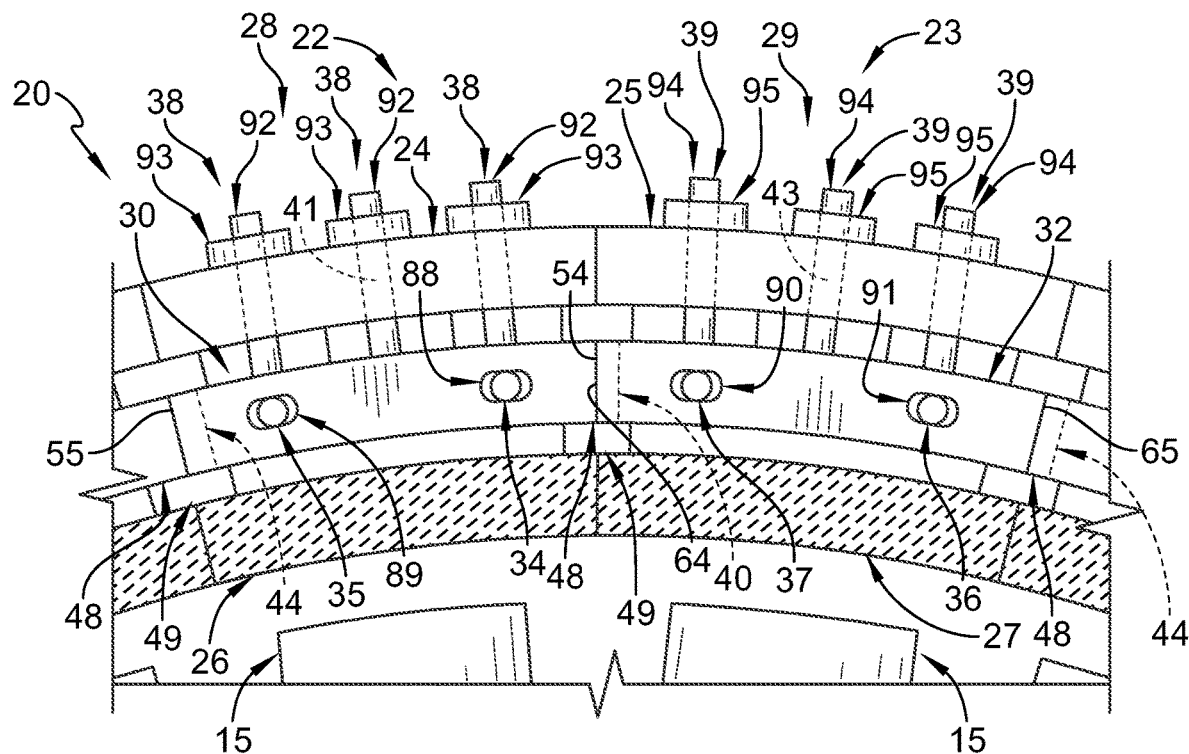
FIG. 5 is a detail view similar to FIG. 3 showing the intermediate carrier of each turbine shroud segment further includes pins that couple the intermediate carrier body to the blade track segment and retainers that each extend radially from the intermediate carrier body and couple the intermediate carrier body with the carrier.

The blade track segment 26, 27 of each shroud segment 22 comprises ceramic matrix composite materials as suggested in FIGS. 2, 5, and 8. The blade track segment 26, 27 is held in place adjacent to tips of blades 15 to block combustion products from passing over the blades 15 without pushing the blades 15 to rotate.

Each of the blade track segments 26, 27 is illustratively formed to include a runner 78, 79 and the attachment portion 80, 81 as shown in FIG. 4. Each runner 78, 79 is arcuate and extends partway around axis 11 adjacent to blades 15. Each runner 78, 79 defines a flow path surface that faces the gas path 21 of the gas turbine engine 10 and the backside surface that faces radially outward toward the carrier 24, 25. Each attachment portion 80, 81 extends radially outward from the backside surface of the corresponding runner 78, 79 to provide structure for coupling the blade track segment 26, 27 to the carrier 24, 25.

In the illustrative embodiment, each attachment portion 80, 81 includes a fore mount post 82, 84 and an aft mount post 83, 85 as shown in FIG. 4. Each mount post 82, 83, 84, 85 extends radially outward from the corresponding runner 78, 79. The aft mount post 83, 85 is spaced apart axially from the fore mount post 82, 84 to define a channel 86, 87 therebetween. In other embodiments, the attachment portion 80, 81 may be provided by L-shaped hangers, fir-tree shaped members, dovetail members, box shape panels, or other suitable features.

The first blade track segment 26 including the runner 78, the first fore mount post 82, and the first aft mount post 83 as shown in FIGS. 4 and 8. The first intermediate carrier body 30 is arranged in the first channel 86 axially between the first fore mount post 82 and the first aft mount post 83. Each of the pins 34, 35 extends axially through the first fore mount post 82, the intermediate carrier body 30, and the first aft mount post 83.

The first intermediate carrier body 30 is shaped to include pin holes 88, 89 that are spaced apart circumferentially towards the circumferential ends 54, 55 of the intermediate carrier body 30 as shown in FIGS. 4-6. The first pin hole 88 extends axially through the intermediate carrier body 30 near the circumferential end 54 of the intermediate carrier body 30. The second pin hole 89 extends axially through the intermediate carrier body 30 near the circumferential end 55 of the intermediate carrier body 30 opposite the first circumferential end 54.

In the illustrative embodiment, each of the first mount posts 82, 83 are also shaped to include corresponding pin holes that are each axially aligned with the pin holes 88, 89 of the first intermediate carrier body 30 as shown in FIG. 4. One pin 34 extends axially through the pin hole formed in the first fore mount post 82, the pin hole 88 of the intermediate carrier body 30, and the pin hole formed in the first aft mount post 83 to couple the blade track segment 26 to the intermediate carrier body 30. In the illustrative embodiment, the second pin 35 extends axially through the pin hole formed in the first fore mount post 82, the pin hole 89 of the intermediate carrier body 30, and the pin hole formed in the first aft mount post to couple the blade track segment 26 to the intermediate carrier body 30.

Each of the first retainers 38 each include a stud 92 and a fastener 93 as shown in FIGS. 4 and 5. The stud 92 is integrally formed with the intermediate carrier body 30 and extends radially outward from the intermediate carrier body 30 through the carrier 24. The fastener 93 has threads that mate with corresponding threads formed in the stud 92 radially outward of the carrier 24. The fasteners 93 mate with the studs 92 to couple the intermediate carrier 28 with the assembled blade track segment 26 to the carrier 24. The fasteners 93 may be tightened to bring the radially-outwardly facing surface of the mount posts 82, 83 into contact with the locating pads formed in the carrier 24.

In the illustrative embodiment, the intermediate carrier body 30 includes at least three retainers 38 as shown in FIGS. 3-5. One retainer 38 extends outward from the intermediate carrier body 32 at a center of the intermediate carrier body 30 along a retainer axis 41. The retainer axis 41 extends radially relative to the central axis 11. The other two retainers 38 are located at opposite circumferential ends 54, 55 of the intermediate carrier body 30. The other two retainers 38 extend parallel to the center retainer 38 that extends along the retainer axis 41.

The second blade track segment 27 including the runner 79, the second fore mount post 84, and the second aft mount post 85 as shown in FIG. 4. The second intermediate carrier body 32 is arranged in the second channel 87 axially between the second fore mount post 84 and the second aft mount post 85. Each of the pins 36, 37 extends axially through the second fore mount post 84, the intermediate carrier body 32, and the second aft mount post 85.

The second intermediate carrier body 32 is shaped to include pin holes 90, 91 that are spaced apart circumferentially towards the circumferential ends 64, 65 of the intermediate carrier body 32 as shown in FIGS. 3-5. The pin hole 90 extends axially through the intermediate carrier body 32 near the circumferential end 64 of the intermediate carrier body 32. The other pin hole 91 extends axially through the intermediate carrier body 32 near the circumferential end 65 of the intermediate carrier body 32 opposite the second circumferential end 64.

In the illustrative embodiment, each of the second mount posts 84, 85 are also shaped to include corresponding pin holes that are each axially aligned with the pin holes 90, 91 of the second intermediate carrier body 32 as shown in FIG. 4. One pin 36 extends axially through the pin hole formed in the second fore mount post 84, the pin hole 90 of the intermediate carrier body 32, and the pin hole formed in the second aft mount post 85 to couple the blade track segment 26 to the intermediate carrier body 32. In the illustrative embodiment, the second pin 37 extends axially through the pin hole formed in the second fore mount post 84, the pin hole 91 of the intermediate carrier body 32, and the pin hole formed in the second aft mount post to couple the blade track segment 26 to the intermediate carrier body 32.

Each of the first retainers 39 each include a stud 94 and a fastener 95 as shown in FIGS. 4 and 5. The stud 94 is integrally formed with the intermediate carrier body 32 and extends radially outward from the intermediate carrier body 32 through the carrier 24. The fastener 95 has threads that mate with corresponding threads formed in the stud 94 radially outward of the carrier 24. The fasteners 95 mate with the studs 94 to couple the intermediate carrier 28 with the assembled blade track segment 26 to the carrier 24. The fasteners 95 may be tightened to bring the radially-outwardly facing surface of the mount posts 84, 85 into contact with the locating pads formed in the carrier 24.

In the illustrative embodiment, the intermediate carrier body 32 includes at least three retainers 39 as shown in FIGS. 3-5. One retainer 39 extends outward from the intermediate carrier body 32 at a center of the intermediate carrier body 32 along a retainer axis 43. The retainer axis 43 extends radially relative to the central axis 11. The other two retainers 39 are located at opposite circumferential ends 64, 65 of the intermediate carrier body 32. The other two retainers 39 extend parallel to the center retainer 39 that extends along the retainer axis 43.

A method of assembling the turbine shroud 20 may include several steps. The method begins by assembling the first turbine shroud segment 22. To assemble the first turbine shroud segment 22, the first intermediate carrier body 30 is arranged axially between the first fore mount post 82 and the first aft mount post 83 of the first blade track segment 26.

Then the pin 34 is inserted axially through the first fore mount post 82, the pin hole 88 formed in the first intermediate carrier body 30, and the first aft mount post 83 to couple the first blade track segment 26 to the first intermediate carrier body 30. The step is repeated for the pin 35 for the other pin hole 89 in the first intermediate carrier body 30.

With the intermediate carrier body 30 assembled with the blade track segment 26, the first intermediate carrier 28 is arranged in the attachment space 77 formed in the first carrier 24. The first intermediate carrier 28 is arranged in the space 77 so that the studs 92 of the retainers 38 extend through corresponding holes formed in the outer wall 73 of the carrier 24.

The first intermediate carrier 28 is then coupled with the first carrier 24. To do so, the fasteners 93 are coupled to the corresponding stud 92 and tightened accordingly. The carrier 24 is then coupled to the turbine case 19.

Once the first turbine shroud segment 22 is assembled in the case 19, the method continues by assembling the second turbine shroud segment 23. To assemble the second turbine shroud segment 23, the second intermediate carrier body 32 is arranged axially between the second fore mount post 84 and the second aft mount post 85 of the second blade track segment 27.

Then the pin 36 is inserted axially through the second fore mount post 84, the pin hole 90 formed in the second intermediate carrier body 32, and the second aft mount post 85 to couple the second blade track segment 27 to the second intermediate carrier body 32. The step is repeated for the pin 37 for the other pin hole 91 in the second intermediate carrier body 32.

With the intermediate carrier body 32 assembled with the blade track segment 27, the second intermediate carrier 29 is arranged in the attachment space 77 formed in the second carrier 25. The second intermediate carrier 29 is arranged in the space 77 so that the studs 94 of the retainers 39 extend through corresponding holes formed in the outer wall 73 of the carrier 25.

The second intermediate carrier 29 is then coupled with the second carrier 25. To do so, the fasteners 95 are coupled to the corresponding stud 94 and tightened accordingly.

Then the second turbine shroud segment 23 is arranged circumferentially adjacent to the first turbine shroud segment 22 in the gas turbine engine 10. The second turbine shroud segment 23 is arranged so that the flange 40 of the first intermediate carrier 28 engages the adjacent circumferential end 64 of the second intermediate carrier body 32 to form the overlap 48 therebetween.

In particular, the second turbine shroud segment 23 is arranged so that the flange 40 is received in the corresponding groove 46. The second turbine shroud segment 23 is then coupled to the turbine case 19.

In the illustrative embodiment, with the second turbine shroud segment 23 assembled in the engine 10, another turbine shroud segment 22 may be assembled and placed in the engine 10.

To do so, the turbine shroud segment 22 assembled like discussed above. Once the turbine shroud segment 22 is assembled, the turbine shroud segment 22 is arranged in the gas turbine engine 10 so that the flange 44 of the second intermediate carrier 29 engages the groove 42 of the adjacent turbine shroud segment 22 to form another overlap 48. These steps are then repeated until the full hoop turbine shroud 20 is assembled.

Figure 9:
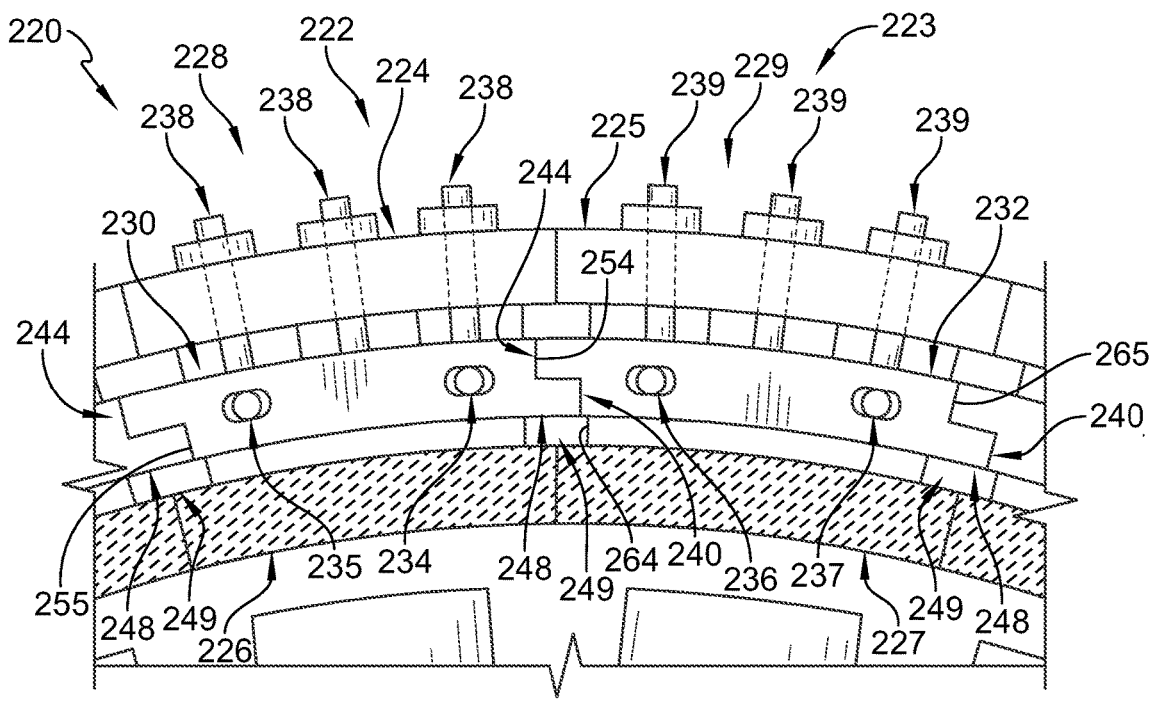
FIG. 9 is a cross-section view of another embodiment of a turbine shroud assembly adapted for use in the gas turbine engine of FIG. 1 showing each turbine shroud segment of the turbine shroud includes a carrier, a blade track segment, and an intermediate carrier configured to couple the blade track segment to the carrier, and showing the intermediate carriers of each turbine shroud segment each include an intermediate carrier body that extends circumferentially partway about the axis and a flange that extends circumferentially from the intermediate carrier body and radially overlaps a flange of the adjacent intermediate carrier body to form an overlap therebetween.
Figure 10:
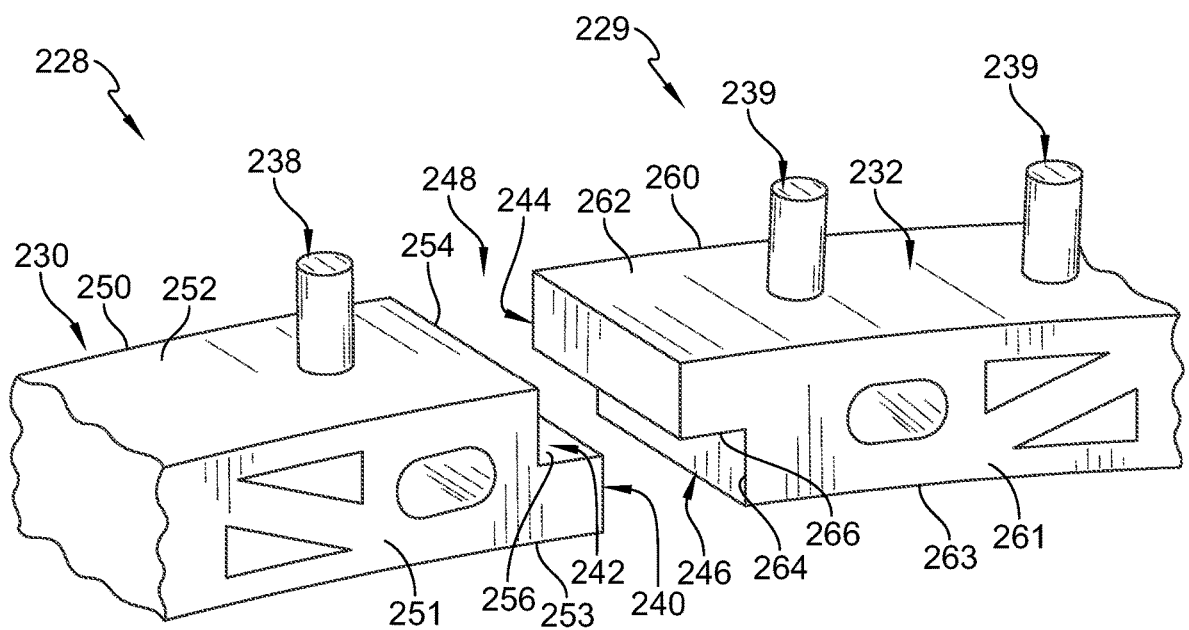
FIG. 10 is an exploded view of the overlap between the adjacent turbine shroud segments of FIG. 9 showing the flange of the first intermediate carrier body mates with a groove formed in the second intermediate carrier body of the adjacent turbine shroud segment and the flange of the second intermediate carrier body mates with a groove formed in the first intermediate carrier body of the adjacent turbine shroud segment.

Another embodiment of a turbine shroud 220 in accordance with the present disclosure is shown in FIGS. 9 and 10. The turbine shroud 220 is substantially similar to the turbine shroud 20 shown in FIGS. 1-8 and described herein. Accordingly, similar reference numbers in the 200 series indicate features that are common between the turbine shroud 20 and the turbine shroud 220. The description of the turbine shroud 20 is incorporated by reference to apply to the turbine shroud 220, except in instances when it conflicts with the specific description and the drawings of the turbine shroud 220.

The turbine shroud 220 is made up of a number of shroud segments 222, 223 that each extend only partway around the central axis 11 of the gas turbine engine as shown in FIG. 9. Each of the shroud segments 222, 223 cooperate to surround the turbine wheel assembly 13 of the turbine section 18 included in the gas turbine engine 10.

Each of the first and second turbine shroud segments 222, 223 includes a carrier 224, 225 a blade track segment 226, 227, and an intermediate carrier 228, 229 configured to couple the blade track segment 226, 227 to the carrier 224, 225 as shown in FIG. 9. The carrier 224, 225 is a metallic support component configured to interface with other metallic components of the gas turbine engine 10. The blade track segment 226, 227 is a ceramic matrix composite component configured to directly face the high temperatures of the gas path 21 of the gas turbine engine 10. The intermediate carrier 228, 229 is designed to engage the corresponding blade track segment 226, 227 so as to couple the blade track segment 226, 227 to the carrier 224, 225 and distribute mounting of the blade track segment 226, 227 to the carrier 224, 225.

Each intermediate carrier 228, 229 of the first and second shroud segments 222, 223 includes an intermediate carrier body 230, 232, illustratively two pins 234, 235, 236, 237 and a plurality of retainers 238, 239 as shown in FIG. 9. The intermediate carrier body 230, 232 is arranged in a channel (not shown) of the corresponding blade track segment 226, 227. The pins 234, 235, 236, 237 extend axially through the blade track segment 226, 227 and the intermediate carrier body 230, 232 to couple the blade track segment 226, 227 to the intermediate carrier body 230, 232. Each of the retainers 238, 239 extends outward from the corresponding intermediate carrier body 230, 232 to the carrier 224, 225 and engages the carrier 224, 225 to couple the intermediate carrier 228, 229 to the carrier 224, 225.

The first intermediate carrier 228 is shaped to include a flange 240 and groove 242 that is configured to mate with a corresponding flange 244 and groove 246 formed in the second intermediate carrier 229 as shown in FIGS. 8 and 10. The flange 240 of the first intermediate carrier 228 extends circumferentially from a circumferential end 254 the first intermediate carrier body 230, while the flange 244 of the second intermediate carrier 229 extends circumferentially from an adjacent circumferential end 264 of the second intermediate carrier body 232. Each of the flanges 240, 242 form the respective groove 242, 246 included in the corresponding intermediate carrier body 230, 232.

The flange 240 of the first intermediate carrier 228 engages the groove 246 of the second intermediate carrier 229, while the flange 244 of the second intermediate carrier 229 engages the groove 244 of the first intermediate carrier 228 to form an overlap 248 therebetween as shown in FIGS. 9 and 10. The overlap 248 closes a gap 249 between the first turbine shroud segment 222 and the second turbine shroud segment 223 and allows relative movement therebetween during operation of the gas turbine engine 10.

In the illustrative embodiments, the flange 244 of the second intermediate carrier 229 radially overlaps the flange 240 of the first intermediate carrier 228. The flange 244 of the second intermediate carrier 229 is spaced radially outward of the flange 240 of the first intermediate carrier 228.

The flange 240 of the first intermediate carrier 228 includes a radially-inwardly facing surface 253 and a radially-outwardly facing surface 256 as shown in FIG. 10. The radially-outwardly facing surface 256 is spaced apart radially from the radially-inwardly facing surface 253. In the illustrative embodiments, the radially-inwardly facing surface 253 is flush with the inner radial surface 253 of the intermediate carrier body 230.

The flange 244 of the second intermediate carrier 229 includes a radially-outwardly facing surface 262 and a radially-inwardly facing surface 266 as shown in FIG. 10. The radially-inwardly facing surface 266 is spaced apart radially from the radially-outwardly facing surface 262. The radially-outwardly facing surface is flush with the outer radial surface 262 of the intermediate carrier body 232.

In the illustrative embodiment, the radially-outwardly facing surface 256 of the flange 240 of the first intermediate carrier 228 engages the radially-inwardly facing surface 266 of the flange 242 of the second intermediate carrier 229. The engaged surfaces 256, 266 54 form the overlap 248.

In the illustrative embodiment, one circumferential end 254 of the first intermediate carrier body 230 is shaped to include the flange 240 and the groove 242, while the other circumferential end 255 is shaped to include a flange 244 and a groove 246 shaped like the flange 244 and the groove 246 of the second intermediate carrier body 232. The flange 244 on the opposite circumferential end 255 may engage a flange 240 of an adjacent turbine shroud 223 to form another overlap 248.

Similarly, one circumferential end 264 of the second intermediate carrier body 232 is shaped to include the flange 244 and the groove 246, while the other circumferential end 265 is shaped to include a flange 240 and a groove 242 shaped like the flange 240 and the groove 242 of the first intermediate carrier body 230. The flange 240 on the opposite circumferential end 265 may engage a flange 244 of an adjacent turbine shroud 222 to form another overlap 248.

A method of assembling the turbine shroud 220 includes similar steps of the previous embodiments. When the second turbine shroud segment 223 is arranged circumferentially adjacent to the first turbine shroud segment 222 in the gas turbine engine 10, the second turbine shroud segment 223 is arranged so that the flange 240 of the first intermediate carrier 228 engages the flange 244 of the second intermediate carrier 229 in the corresponding grooves 242, 246. The flanges 240, 244 engage so that the flange 244 of the second intermediate carrier 229 radially overlaps the flange 240 of the first intermediate carrier 228.

In the illustrative embodiment, with the second turbine shroud segment 223 assembled in the engine 10, another turbine shroud segment 222 may be assembled and placed in the engine 10. To do so, the turbine shroud segment 222 assembled like discussed above. Once the turbine shroud segment 222 is assembled, the turbine shroud segment 222 is arranged in the gas turbine engine 10 so that the flange 240 of the second intermediate carrier 229 engages the flange 244 of the added turbine shroud segment 222. These steps are then repeated until the full hoop turbine shroud 220 is assembled.

Figure 11:
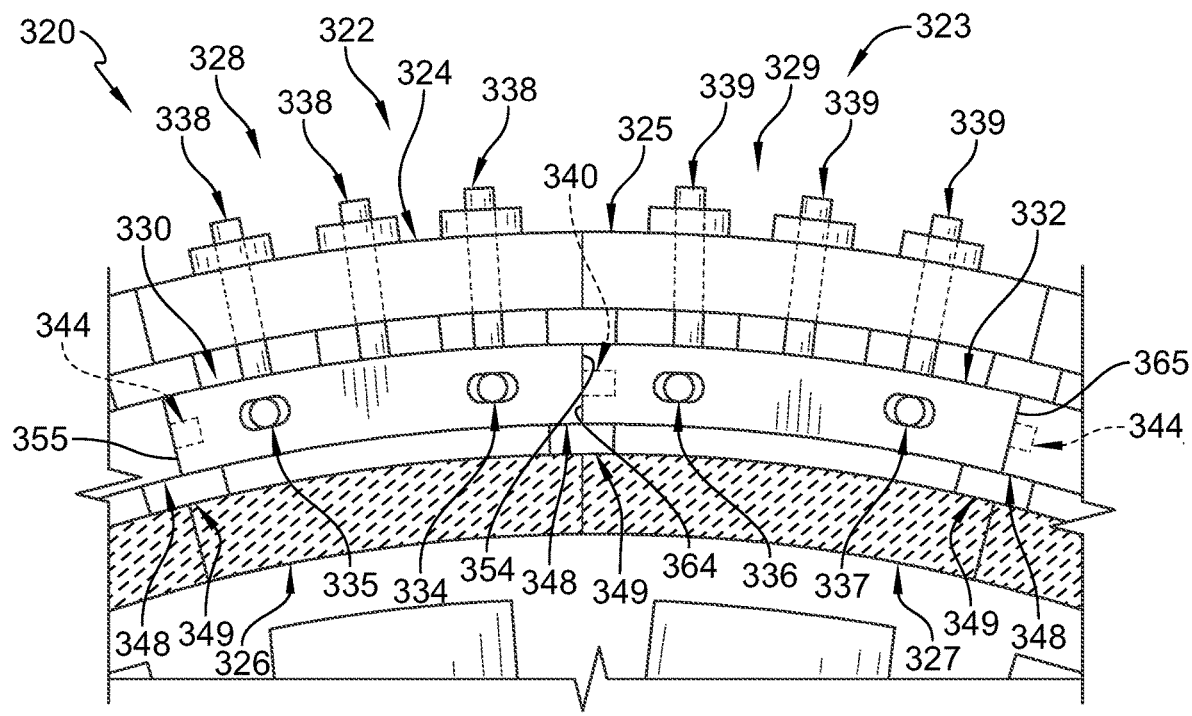
FIG. 11 is a cross-section view of another embodiment of a turbine shroud assembly adapted for use in the gas turbine engine of FIG. 1 showing each turbine shroud segment of the turbine shroud includes a carrier, a blade track segment, and an intermediate carrier configured to couple the blade track segment to the carrier, and showing the intermediate carriers of each turbine shroud segment each include an intermediate carrier body that extends circumferentially partway about the axis and a flange that extends circumferentially from the intermediate carrier body and radially overlaps a flange of the adjacent intermediate carrier body to form an overlap therebetween.
Figure 12:
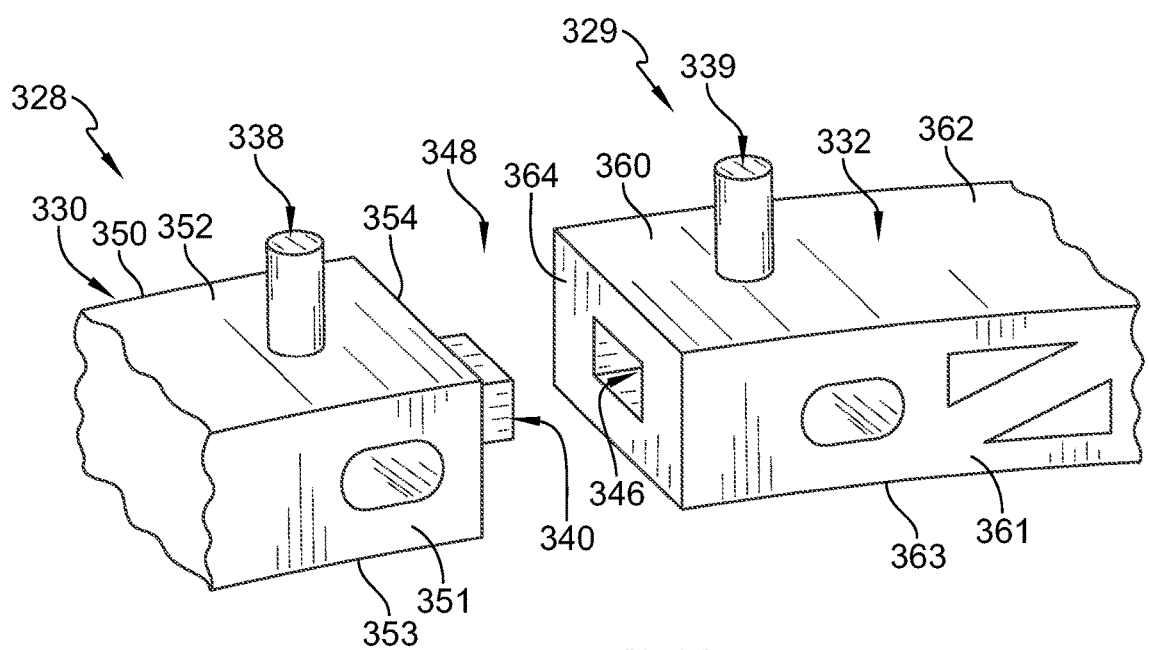
FIG. 12 an exploded view of the overlap between the adjacent turbine shroud segments of FIG. 11 showing the flange of the first intermediate carrier body mates with a groove formed in the second intermediate carrier body of the adjacent turbine shroud segment and the flange of the second intermediate carrier body mates with a groove formed in the first intermediate carrier body of the adjacent turbine shroud segment.

Another embodiment of a turbine shroud 320 in accordance with the present disclosure is shown in FIGS. 11 and 12. The turbine shroud 320 is substantially similar to the turbine shroud 20 shown in FIGS. 1-8 and described herein. Accordingly, similar reference numbers in the 300 series indicate features that are common between the turbine shroud 20 and the turbine shroud 320. The description of the turbine shroud 20 is incorporated by reference to apply to the turbine shroud 320, except in instances when it conflicts with the specific description and the drawings of the turbine shroud 320.

The turbine shroud 320 is made up of a number of shroud segments 322, 323 that each extend only partway around the central axis 11 of the gas turbine engine. Each of the shroud segments 322, 323 cooperate to surround the turbine wheel assembly 13 of the turbine section 18 included in the gas turbine engine 10.

Each of the first and second turbine shroud segments 322, 323 includes a carrier 324, 325 a blade track segment 326, 327, and an intermediate carrier 328, 329 configured to couple the blade track segment 326, 327 to the carrier 324, 325 as shown in FIG. 11. The carrier 324, 325 is a metallic support component configured to interface with other metallic components of the gas turbine engine 10. The blade track segment 326, 327 is a ceramic matrix composite component configured to directly face the high temperatures of the gas path 21 of the gas turbine engine 10. The intermediate carrier 328, 329 is designed to engage the corresponding blade track segment 326, 327 so as to couple the blade track segment 326, 327 to the carrier 324, 325 and distribute mounting of the blade track segment 326, 327 to the carrier 324, 325.

Each intermediate carrier 328, 329 of the first and second shroud segments 322, 323 includes an intermediate carrier body 330, 332, illustratively two pins 334, 335, 336, 337 and a plurality of retainers 338, 339 as shown in FIG. 11. The intermediate carrier body 330, 332 is arranged in a channel (not shown) of the corresponding blade track segment 326, 327. The pins 334, 335, 336, 337 extend axially through the blade track segment 326, 327 and the intermediate carrier body 330, 332 to couple the blade track segment 326, 327 to the intermediate carrier body 330, 332. Each of the retainers 338, 339 extends outward from the corresponding intermediate carrier body 330, 332 to the carrier 324, 325 and engages the carrier 324, 325 to couple the intermediate carrier 328, 329 to the carrier 324, 325.

The first intermediate carrier 328 is shaped to include a flange 340 that mates with a groove 346 formed in the second intermediate carrier 329 as shown in FIGS. 11 and 12. The flange 340 extends circumferentially from a circumferential end 354 the first intermediate carrier body 330 and engages the groove 346 formed in an adjacent circumferential end 364 of the second intermediate carrier body 332 to form an overlap 348 therebetween. The overlap 348 closes a gap 349 between the first turbine shroud segment 322 and the second turbine shroud segment 323 and allows relative movement therebetween during operation of the gas turbine engine 10.

The first intermediate carrier body 330 is shaped to include forward and aft side surfaces 350, 351, outer and inner radial surfaces 352, 353, and circumferential ends 354, 355 as shown in FIGS. 11 and 12. The aft side surface 351 is spaced apart axially from the forward side surface 350, while the inner radial surface 353 is spaced apart radially from the outer radial surface 352. The forward and aft side surfaces 350, 351 extend between and interconnect the outer radial surface 352 and the inner radial surface 353. The circumferential ends 354, 355 are spaced apart circumferentially from each other and each extend between and interconnect the forward side surface 350 and the aft side surface 351.

In the illustrative embodiment, one circumferential end 354 is shaped to include the flange 340, while the other circumferential end 355 may have a groove (not shown) like the groove 346 formed in the second intermediate carrier body 332. The groove formed in the circumferential end 355 is configured to receive a flange 344 of another turbine shroud segment 323 opposite the second turbine shroud segment 323. In the illustrative embodiment, edges of the flange 340 are spaced apart axially and radially from the forward side surface 350 and the aft side surface 351 of the first intermediate carrier body 330.

The second intermediate carrier body 332 is shaped to include forward and aft side surfaces 360, 361, outer and inner radial surface 362, 363, and circumferential ends 364, 365 as shown in FIG. 6. The aft side surface 361 is spaced apart axially from the forward side surface 360, while the inner radial surface 363 is spaced apart radially from the outer radial surface 362. The forward and aft side surfaces 360, 361 extend between and interconnect the outer radial surface 362 and the inner radial surface 363. The circumferential ends 364, 365 are spaced apart circumferentially from each other and each extend between and interconnect the forward side surface 360 and the aft side surface 361.

In the illustrative embodiment, one circumferential end 364 is shaped to include the groove 346, while the other circumferential end 365 is shaped to include a flange 344. The flange 344 extends circumferentially from the circumferential end 365 of the second intermediate carrier body 332 and engages the groove formed in another turbine shroud segment 322 opposite the first turbine shroud segment 322.

A method of assembling the turbine shroud 320 include similar steps of the previous embodiments. When the second turbine shroud segment 323 is arranged circumferentially adjacent to the first turbine shroud segment 322 in the gas turbine engine 10, the second turbine shroud segment 323 is arranged so that the flange 340 of the first intermediate carrier 328 is inserted into the groove 346 of the second intermediate carrier 329.

In the illustrative embodiment, with the second turbine shroud segment 323 assembled in the engine 10, another turbine shroud segment 322 may be assembled and placed in the engine 10. To do so, the turbine shroud segment 322 assembled like discussed above. Once the turbine shroud segment 322 is assembled, the turbine shroud segment 322 is arranged in the gas turbine engine 10 so that the flange 344 of the second intermediate carrier 329 is inserted into the groove of the added turbine shroud segment 322. These steps are then repeated until the full hoop turbine shroud 320 is assembled.

Figure 13:
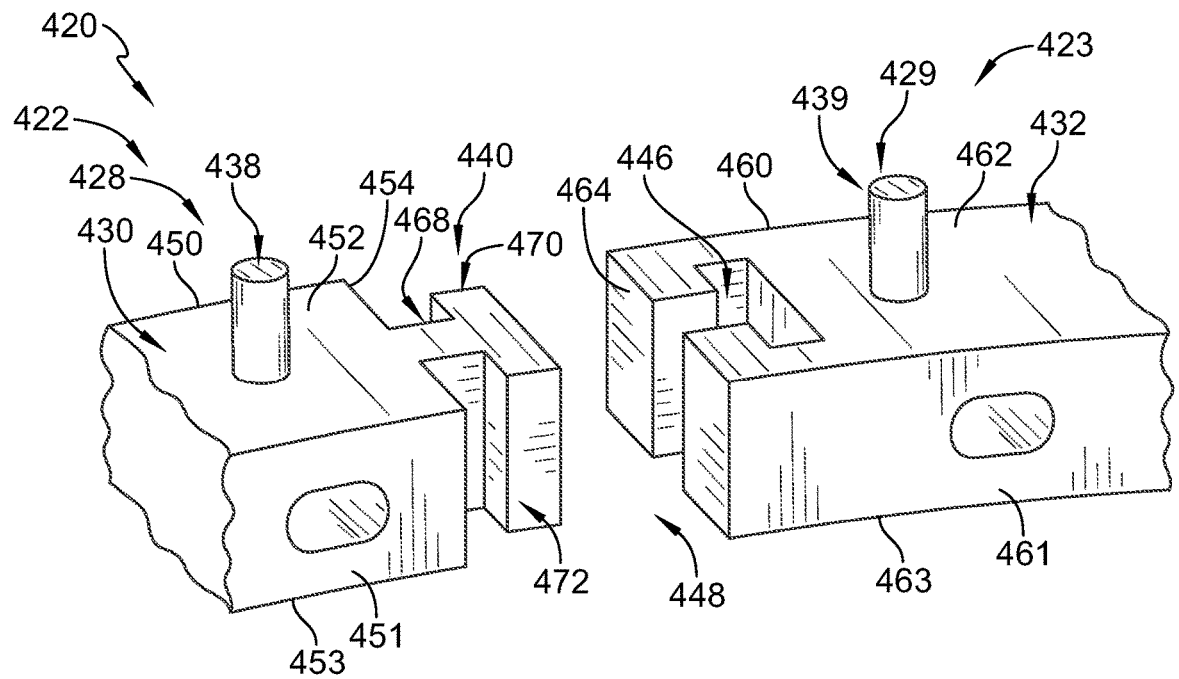
FIG. 13 is an exploded view of another embodiment of the overlap between intermediate carriers of the adjacent turbine shroud segments of the turbine shroud in the gas turbine engine of FIG. 1 showing the flange of the first intermediate carrier includes a stem that extends circumferentially from the circumferential end of the first intermediate carrier body, a forward portion that extends axially forward from the stem at an end of the stem, and an aft portion that extends axially aft from the stem at the end of the stem.

Another embodiment of a turbine shroud 420 in accordance with the present disclosure is shown in FIG. 13. The turbine shroud 420 is substantially similar to the turbine shroud 20 shown in FIGS. 1-8 and described herein. Accordingly, similar reference numbers in the 400 series indicate features that are common between the turbine shroud 20 and the turbine shroud 420. The description of the turbine shroud 20 is incorporated by reference to apply to the turbine shroud 420, except in instances when it conflicts with the specific description and the drawings of the turbine shroud 420.

The turbine shroud 420 is made up of a number of shroud segments 422, 423 that each extend only partway around the central axis 11 of the gas turbine engine. Each of the first and second turbine shroud segments 422, 423 includes an intermediate carrier 428, 429 to couple a blade track segment to a carrier included in each of the turbine shroud segments 422, 423 as shown in FIG. 12.

Each intermediate carrier 428, 429 of the first and second shroud segments 422, 423 includes an intermediate carrier body 430, 432, two pins (not shown), and a plurality of retainers 438, 439 as shown in FIG. 12. Each intermediate carrier body 430, 432 is configured to be arranged adjacent the corresponding blade track segment. Each of the retainers 438, 439 extends outward from the corresponding intermediate carrier body 430, 432 to the carrier to couple the intermediate carrier 428, 429 to the corresponding carrier.

The first intermediate carrier 428 is shaped to include a flange 440 that mates with a groove 446 formed in the second intermediate carrier 429 as shown in FIG. 12. The flange 440 extends circumferentially from a circumferential end 454 the first intermediate carrier body 430 and engages the groove 446 formed in an adjacent circumferential end 464 of the second intermediate carrier body 432 to form an overlap 448 therebetween.

The overlap 448 allows relative movement between the segments 422, 423 during operation of the gas turbine engine 10. However, the overlap 448 also is configured to limit circumferential deformation with respect to each segment 422, 423. The flange 240 may not engage the groove 246 during normal operation of the gas turbine engine 10, but in the event of a detached blade 15, the flange 240 and groove 246 may engage and provide hoop stiffening for the turbine shroud 420.

In the illustrative embodiments, the first intermediate carrier body 430 is shaped to include forward and aft side surfaces 450, 451, outer and inner radial surfaces 452, 453, and the circumferential end 454 as shown in FIG. 5. The aft side surface 451 is spaced apart axially from the forward side surface 450, while the inner radial surface 453 is spaced apart radially from the outer radial surface 452. The forward and aft side surfaces 450, 451 extend between and interconnect the outer radial surface 452 and the inner radial surface 453. The circumferential end 454 extends between and interconnects the forward side surface 450 and the aft side surface 451.

The flange 440 of the first intermediate carrier 428 is shaped to include a stem 468, a forward portion 470, and an aft portion 472 as shown in FIG. 10. The stem 468 extends circumferentially from the circumferential end 454 of the first intermediate carrier body 430. The forward portion 470 extends axially forward from the stem 468 at an end of the stem 468. The aft portion 472 extends axially aft from the stem 468 at the end of the stem 468.

In the illustrative embodiment, edges of the flange 440 are spaced apart axially from the forward and aft side surfaces 450, 451 of the first intermediate carrier body 430. The edges of the forward and aft portions 470, 472 of the flange 440 are also spaced apart axially from the forward and aft side surfaces 450, 451.

The second intermediate carrier body 432 is shaped to include forward and aft side surfaces 460, 461, outer and inner radial surface 462, 463, and the circumferential end 464 as shown in FIG. 6. The aft side surface 461 is spaced apart axially from the forward side surface 460, while the inner radial surface 463 is spaced apart radially from the outer radial surface 462. The forward and aft side surfaces 460, 461 extend between and interconnect the outer radial surface 462 and the inner radial surface 463. The circumferential end 464 extends between and interconnects the forward side surface 460 and the aft side surface 461. In the illustrative embodiment, the groove 446 is shaped to match the shape of the flange 440.

Figure 14:
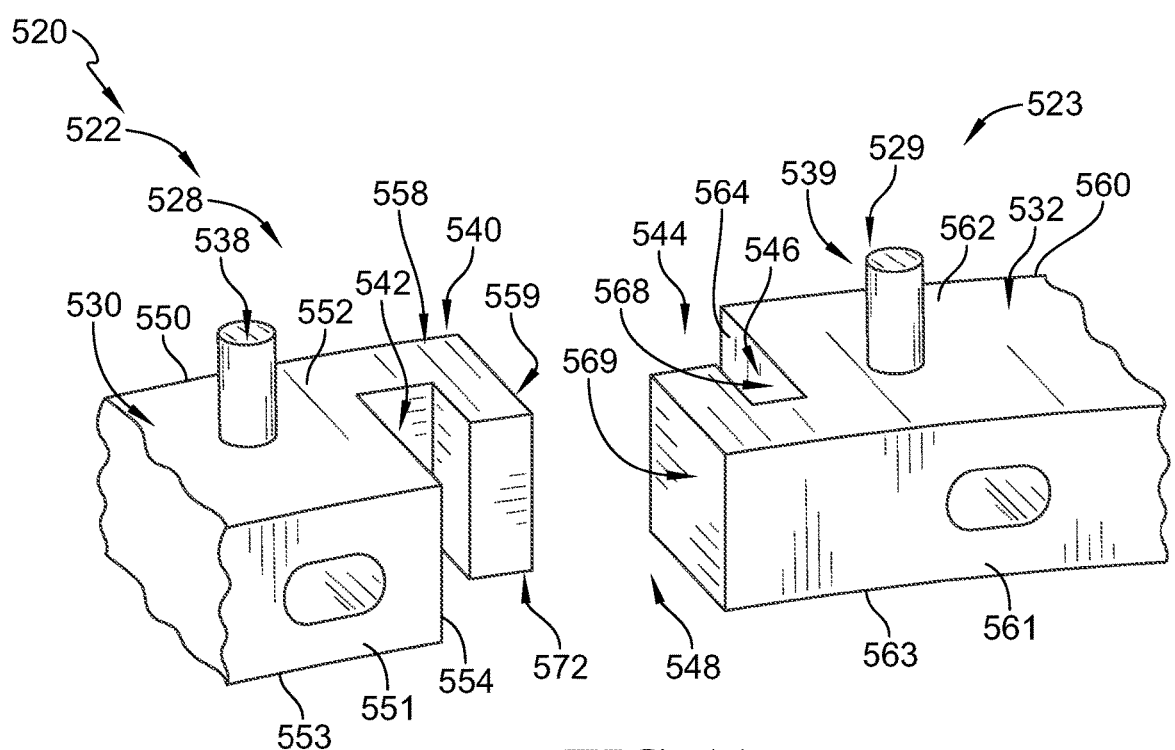
FIG. 14 is an exploded view of another embodiment of the overlap between intermediate carriers of the adjacent turbine shroud segments of the turbine shroud in the gas turbine engine of FIG. 1 showing the flange of the first intermediate carrier and the flange of the second intermediate carrier are hooks that are configured to mate with each other.

Another embodiment of a turbine shroud 520 in accordance with the present disclosure is shown in FIG. 14. The turbine shroud 520 is substantially similar to the turbine shroud 20 shown in FIGS. 1-8 and described herein. Accordingly, similar reference numbers in the 500 series indicate features that are common between the turbine shroud 20 and the turbine shroud 520. The description of the turbine shroud 20 is incorporated by reference to apply to the turbine shroud 520, except in instances when it conflicts with the specific description and the drawings of the turbine shroud 520.

The turbine shroud 520 is made up of a number of shroud segments 522, 523 that each extend only partway around the central axis 11 of the gas turbine engine. Each of the first and second turbine shroud segments 522, 523 includes an intermediate carrier 528, 529 to couple a blade track segment to a carrier included in each of the turbine shroud segments 522, 523 as shown in FIG. 14.

Each intermediate carrier 528 of the first and second shroud segments 522, 523 includes an intermediate carrier body 530, 532, two pins (not shown), and a plurality of retainers 538, 539 as shown in FIG. 14. Each intermediate carrier body 530, 532 is configured to be arranged adjacent the corresponding blade track segment. Each of the retainers 538, 539 extends outward from the corresponding intermediate carrier body 530, 532 to the carrier to couple the intermediate carrier 528, 529 to the corresponding carrier.

The first intermediate carrier 528 is shaped to include a flange 540 and groove 542 that is configured to mate with a corresponding flange 544 and groove 546 formed in the second intermediate carrier 529 as shown in FIG. 14. The flange 540 of the first intermediate carrier 528 extends circumferentially from a circumferential end 554 the first intermediate carrier body 530, while the flange 544 of the second intermediate carrier 529 extends circumferentially from an adjacent circumferential end 564 of the second intermediate carrier body 532. Each of the flanges 540, 542 form the respective groove 542, 546 in the body 530, 532.

The flange 540 of the first intermediate carrier 528 engages the groove 546 of the second intermediate carrier 529, while the flange 544 of the second intermediate carrier 529 engages the groove 544 of the first intermediate carrier 528 to form an overlap 548 therebetween. The overlap 548 allows relative movement between the segments 522, 523 during operation of the gas turbine engine 10.

The overlap 548 is configured to limit circumferential deformation with respect to each segment 522, 523. The flange 540 may not engage the groove 546 during normal operation of the gas turbine engine 10, but in the event of a detached blade 15, the flange 540 and groove 546 may engage and provide hoop stiffening for the turbine shroud 520.

In the illustrative embodiments, the first intermediate carrier body 530 is shaped to include forward and aft side surfaces 550, 551, outer and inner radial surfaces 552, 553, and the circumferential end 554 as shown in FIG. 14. The aft side surface 551 is spaced apart axially from the forward side surface 550, while the inner radial surface 553 is spaced apart radially from the outer radial surface 552. The forward and aft side surfaces 550, 551 extend between and interconnect the outer radial surface 552 and the inner radial surface 553.

The flange 540 of the first intermediate carrier 528 is a first hook 540 that includes a stem 558 and an axially-extending portion 559 as shown in FIG. 14. The stem 558 extends circumferentially from the circumferential end 554 of the first intermediate carrier body 530. The axially-extending portion 559 extends axially aft from the stem 558 to form the groove 542, or a first flange channel 542. The first flange channel 542 opens axially aft to receive the flange 544 of the second intermediate carrier 529. In the illustrative embodiment, the stem 558 is flush with the forward side surface 550.

In the illustrative embodiment, the second intermediate carrier body 532 is shaped to include forward and aft side surfaces 560, 561, outer and inner radial surface 562, 563, and the circumferential end 564 as shown in FIG. 14. The aft side surface 561 is spaced apart axially from the forward side surface 560, while the inner radial surface 563 is spaced apart radially from the outer radial surface 562. The forward and aft side surfaces 560, 561 extend between and interconnect the outer radial surface 562 and the inner radial surface 563.

The flange 544 of the second intermediate carrier 529 is a second hook 544 that includes a stem 568 and an axially-extending portion 569 as shown in FIG. 14. The stem 568 extends circumferentially from the adjacent circumferential end 564 of the second intermediate carrier body 532. The axially-extending portion 569 extends axially forward from the stem 568 to form the groove 546, or a second flange channel 546. The second flange channel 546 opens axially forward to receive the flange 240 of the second intermediate carrier 529. In the illustrative embodiment, the stem 568 is flush with the aft side surface 561.

In the illustrative embodiment, the first hook 540 mates with the second hook 544 to form the overlap 548 as shown in FIG. 14. The axially-extending portion 559 of the first hook 540 is located in the second flange channel 546, while the axially-extending portion 569 of the second hook 544 is located in the first flange channel 542 to form the overlap 548.

The present disclosure relates to a method for enabling the use of an intermediate carrier 28, 29, 228, 229, 328, 329, 428, 429, 528, 529 to couple a blade track segment 26, 27, 226, 227, 326, 327, 426, 427, 526, 527 to a carrier 24, 25, 24, 225, 324, 325, 424, 425, 524, 525 that also provides containment capabilities. The adjacent intermediate carriers 28, 29, 228, 229, 328, 329, 428, 429, 528, 529 having mating features that contain the loss of a turbine blade 15 in the event that the loss of a blade 15 were to occur. The overlap 48, 248, 348, 448, 548 between the adjacent intermediate carriers 28, 29, 228, 229, 328, 329, 428, 429, 528, 529 ensures that the intermediate carrier 28, 29, 228, 229, 328, 329, 428, 429, 528, 529 prevents a detached blade 15 from bypassing the intermediate carrier 28, 29, 228, 229, 328, 329, 428, 429, 528, 529 prior to contacting the outer most portion of the carrier 24, 25, 24, 225, 324, 325, 424, 425, 524, 525.

In the embodiment of FIGS. 9 and 10, the radially overlapping radial extensions 240, 244 extend circumferentially from the corresponding intermediate carrier body 230, 232. These extensions 240, 244 may overlap as much as possible without hindering the assembly of the turbine shroud segment 222, 223 in the engine 10. By overlapping, there is no "free space" or gap 249 where the blade 15 may get between the adjacent intermediate carriers 228, 229.

The blade 15 would have to force its way through the overlap or the non-overlapping portion of the intermediate carrier 228, 229 prior to contacting the carrier 224, 225. This will result in a loss of energy in the blade 15 and, thus, help to contain the blade 15 and help keep it from being able to exit the engine 10. The overlap features 240, 244 may be sized such that the features 240, 244 provide the minimum capability of the rest of the intermediate carrier 228, 229 to minimize any weight impact.

In the embodiment of FIGS. 1-8, the "overlap" features (i.e. the flange 40 and the groove 46 are radial instead of circumferential. The radial features 40, 46 may provide better containment capability than the radially over lapping extensions 240, 244 due to an increase in the moment of inertia.

In the embodiment of FIGS. 11 and 12, the flange 340 provided in one end 354 of the intermediate carrier 328 engages with a negative feature or the groove 346 in the adjacent intermediate carrier 329. The flange 340 and the groove 346 may provide a positive capture of the overlap.

In the embodiments of FIGS. 13 and 14, the ends 454, 464, 554, 564 of the intermediate carriers 428, 429, 528, 529 may have features 440, 446, 540, 544 that may limit circumferential deformation with respect to one another. The hook features 540, 544 may be loose fitting and not engage during normal operation as well as allowing easy assembly. In the event of a blade off where there may be high local strains (maybe even plastic deformation) of the intermediate carriers 528, 529 due to the blade 15 attempting to pass through the intermediate carriers 528, 529, the hook features 540, 544 may engage. By engaging, the hook features 540, 544 may then provide some hoop stiffening. In this way, additional containment capability may be gained possibly with smaller/thinner containment features.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud adapted for use in a gas turbine engine, the turbine shroud comprising
    a first turbine shroud segment including a first carrier comprising a fore wall, an aft wall, and metallic materials and arranged to extend circumferentially at least partway about a center axis, a first blade track segment comprising ceramic matrix composite materials, and a first intermediate carrier configured to couple the first blade track segment to the first carrier, at least one of the fore wall and aft wall extend radially inward past the first intermediate carrier, the first blade track segment formed to include a first runner shaped to extend circumferentially partway around the center axis, a first fore mount post that extends radially outward from the first runner, and a first aft mount post that extends radially outward from the first runner, and the first aft mount post spaced apart axially from the first fore mount post to define a first channel therebetween, and the first intermediate carrier is arranged axially in the first channel of the first blade track segment, and
    a second turbine shroud segment arranged circumferentially adjacent to the first turbine shroud segment, the second turbine shroud segment including a second carrier comprising metallic materials and arranged to extend circumferentially at least partway about the center axis, a second blade track segment comprising ceramic matrix composite materials, and a second intermediate carrier configured to couple the second blade track segment to the second carrier, the second blade track segment formed to include a second runner shaped to extend circumferentially partway around the center axis, a second fore mount post that extends radially outward from the second runner, and a second aft mount post that extends radially outward from the second runner, and the second aft mount post spaced apart axially from the second fore mount post to define a second channel therebetween, and the second intermediate carrier is arranged in the second channel of the second blade track segment,
    wherein the first intermediate carrier includes a first intermediate carrier body arranged between the first fore mount post and the first aft mount post in the first channel, a plurality of first retainers that extend radially outward from the first intermediate carrier body and into corresponding through holes defined in the first carrier, and a flange that extends circumferentially from a circumferential end of the first intermediate carrier body and engages an adjacent circumferential end of a second intermediate carrier body included in the second intermediate carrier to form an overlap between the first intermediate carrier body and the second intermediate carrier body that closes a gap between the first turbine shroud segment and the second turbine shroud segment and allows relative movement therebetween during operation of the gas turbine engine.

2. The turbine shroud of claim 1, wherein the second intermediate carrier body is shaped to include a groove that extends circumferentially into the adjacent circumferential end of the second intermediate carrier body and receives the flange of the first intermediate carrier to form the overlap.

3. The turbine shroud of claim 2, wherein the first intermediate carrier body is shaped to include a forward side surface and an aft side surface spaced apart axially from the forward side surface, the circumferential end extends between and interconnects the forward side surface and the aft side surface, and edges of the flange are spaced apart axially from the forward side surface and the aft side surface of the first intermediate carrier body.

4. The turbine shroud of claim 3, wherein the first intermediate carrier body is shaped to include an outer radial surface and an inner radial surface spaced apart radially from the outer radial surface, the forward and aft side surfaces extend between and interconnect the outer radial surface and the inner radial surface, and edges of the flange are spaced apart radially from the outer radial surface and the inner radial surface of the first intermediate carrier body.

5. The turbine shroud of claim 4, wherein the flange of the first intermediate carrier includes a stem that extends circumferentially from the circumferential end of the first intermediate carrier body, a forward portion that extends axially forward from the stem at an end of the stem, and an aft portion that extends axially aft from the stem at the end of the stem.

6. The turbine shroud of claim 1, wherein the second intermediate carrier further includes a flange that extends circumferentially from the adjacent circumferential end of the second intermediate carrier body and engages the flange of the first intermediate carrier to form the overlap.

7. The turbine shroud of claim 6, wherein the flange of the second intermediate carrier radially overlaps the flange of the first intermediate carrier.

8. The turbine shroud of claim 7, wherein the flange of the first intermediate carrier includes a radially-outwardly facing surface, the flange of the second intermediate carrier includes a radially-inwardly facing surface, and the radially-outwardly facing surface engages the radially-inwardly facing surface to form the overlap.

9. The turbine shroud of claim 6, wherein the flange of the first intermediate carrier is a first hook that includes a stem that extends circumferentially from the circumferential end of the first intermediate carrier body and an axially-extending portion that extends axially aft from the stem to form a first flange channel that opens axially aft, the flange of the second intermediate carrier is a second hook that includes a stem that extends circumferentially from the adjacent circumferential end of the second intermediate carrier body and an axially-extending portion that extends axially forward from the stem to form a second flange channel that opens axially forward, and the axially-extending portion of the first hook is located in the second flange channel and the axially-extending portion of the second hook is located in the first flange channel to form the overlap.

10. The turbine shroud of claim 1, wherein the first intermediate carrier further includes at least one pin that extends axially into the first fore mount post, the first intermediate carrier body, and the first aft mount post to couple the first intermediate carrier body to the first blade track segment and the plurality of first retainers couple the first intermediate carrier body with the first carrier, and wherein the second intermediate carrier body further includes at least one pin that extends axially into the second fore mount post, the second intermediate carrier body, and the second aft mount post to couple the second intermediate carrier body to the second blade track segment and second retainers that each extend radially and couple the second intermediate carrier body with the second carrier.

11. A turbine shroud adapted for use in a gas turbine engine, the turbine shroud comprising
   a first turbine shroud segment including a first carrier comprising a fore wall, and an aft wall, and arranged to extend circumferentially at least partway about a center axis, a first blade track segment, and a first intermediate carrier configured to couple the first blade track segment to the first carrier, at least one of the fore wall and aft wall extend radially inward past the first intermediate carrier, wherein the first blade track segment formed to include a first runner shaped to extend circumferentially partway around the center axis and a first attachment portion that extends radially outward from the first runner, the first runner directly facing a gas path of the gas turbine engine, and
   a second turbine shroud segment arranged circumferentially adjacent to the first turbine shroud segment, the second turbine shroud segment including a second carrier arranged to extend circumferentially at least partway about the center axis, a second blade track segment, and a second intermediate carrier configured to couple the second blade track segment to the second carrier, wherein the second blade track segment formed to include a second runner shaped to extend circumferentially partway around the center axis and a second attachment portion that extends radially outward from the second runner, the second runner directly facing a gas path of the gas turbine engine,
   wherein the first intermediate carrier is shaped to include a first intermediate carrier body coupled with the first attachment portion of the first blade track segment, a plurality of first retainers that extend radially outward from the first intermediate carrier body and into corresponding radially inward opening holes defined in the first carrier to couple the first carrier with the first intermediate carrier body, and a flange that extends circumferentially from a circumferential end of the first intermediate carrier body and engages an adjacent circumferential end of a second intermediate carrier body included in the second intermediate carrier to form an overlap therebetween.

12. The turbine shroud of claim 11, wherein the second intermediate carrier body is shaped to include a groove that extends circumferentially into the adjacent circumferential end of the second intermediate carrier body and receives the flange of the first intermediate carrier to form the overlap.

13. The turbine shroud of claim 12, wherein edges of the flange are spaced apart axially from edges of the circumferential end of the first intermediate carrier body.

14. The turbine shroud of claim 12, wherein the flange of the first intermediate carrier includes a stem that extends circumferentially from the circumferential end of the first intermediate carrier body, a forward portion that extends axially forward from the stem at an end of the stem, and an aft portion that extends axially aft from the stem at the end of the stem.

15. The turbine shroud of claim 11, wherein the second intermediate carrier further includes a flange that extends circumferentially from the adjacent circumferential end of the second intermediate carrier body and engages the flange of the first intermediate carrier to form the overlap.

16. The turbine shroud of claim 15, wherein the flange of the second intermediate carrier radially overlaps the flange of the first intermediate carrier.

17. The turbine shroud of claim 15, wherein the flange of the first intermediate carrier is a first hook that includes a stem that extends circumferentially from the circumferential end of the first intermediate carrier body and an axially-extending portion that extends axially aft from the stem to form a first flange channel that opens axially aft, the flange of the second intermediate carrier is a second hook that includes a stem that extends circumferentially from the adjacent circumferential end of the second intermediate carrier body and an axially-extending portion that extends axially forward from the stem to form a second flange channel that opens axially forward, and the axially-extending portion of the first hook is located in the second flange channel and the axially-extending portion of the second hook is located in the first flange channel to form the overlap.

18. A method comprising
   providing a first turbine shroud segment including a first carrier, a first blade track segment, and a first intermediate carrier, the first carrier comprising a fore wall and an aft wall, the first blade track segment including a first runner shaped to extend partway around an axis, a first fore mount post that extends radially outward from the first runner, and a first aft mount post spaced apart axially from the first fore mount post that extends radially outward from the first runner, and the first intermediate carrier including a first intermediate carrier body, a plurality of first retainers, a flange that extends circumferentially from a circumferential end of the first intermediate carrier body, and pins,
   providing a second turbine shroud segment including a second carrier, a second blade track segment, and a second intermediate carrier, the second blade track segment including a second runner shaped to extend partway around the axis, a second fore mount post that extends radially outward from the second runner, and a second aft mount post spaced apart axially from the second fore mount post that extends radially outward from the second runner, and the second intermediate carrier including a second intermediate carrier body and pins,
   arranging the first intermediate carrier body axially between the first fore mount post and the first aft mount post of the first blade track segment,
   inserting the pins axially through the first fore mount post, the first intermediate carrier body, and the first aft mount post to couple the first blade track segment to the first intermediate carrier body,
   arranging the first intermediate carrier in an attachment space formed in the first carrier,
   coupling the first intermediate carrier with the first carrier by the plurality of first retainers that extend radially outward from the first intermediate carrier body and into through holes defined in the first carrier, at least one of the fore wall and aft wall extend radially inward past the first intermediate carrier,
   arranging the second intermediate carrier body axially between the second fore mount post and the second aft mount post of the second blade track segment,
   inserting the pins axially through the second fore mount post, the second intermediate carrier body, and the second aft mount post to couple the second blade track segment to the second intermediate carrier body,
   arranging the second intermediate carrier in an attachment space formed in the second carrier,
   coupling the second intermediate carrier with the first carrier, and arranging the second turbine shroud segment circumferentially adjacent to the first turbine shroud segment in the gas turbine engine so that the flange of the first intermediate carrier engages an adjacent circumferential end of the second intermediate carrier body to form an overlap therebetween.

19. The turbine shroud of claim 16, wherein the flange of the first intermediate carrier includes a radially-outwardly facing surface, the flange of the second intermediate carrier includes a radially-inwardly facing surface, and the radially-outwardly facing surface engages the radially-inwardly facing surface to form the overlap.

20. The turbine shroud of claim 11, wherein the first intermediate carrier further includes at least one pin that extends axially into the first blade track segment and the first intermediate carrier body to couple the first intermediate carrier body to the first blade track segment, wherein the second intermediate carrier further includes at least one pin that extends axially into the second blade track segment and the second intermediate carrier to couple the second intermediate carrier to the second blade track segment, and wherein the at least one pin that extends into the first blade track segment and the first intermediate carrier body and the at least one pin that extends axially into the second blade track segment and the second intermediate carrier are spaced apart circumferentially from the flange of the first intermediate carrier.

\* \* \* \* \*